(12) United States Patent
Mizuguchi et al.

(10) Patent No.: US 9,537,570 B2
(45) Date of Patent: Jan. 3, 2017

(54) OPTICAL TRANSCEIVING APPARATUS, OPTICAL TRANSMITTING METHOD, AND OPTICAL TRANSMITTING DEVICE

(71) Applicant: FUJITSU LIMITED, Kawasaki-shi (JP)

(72) Inventors: Noriaki Mizuguchi, Sapporo (JP); Hiroaki Tomofuji, Sapporo (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 13/767,119

(22) Filed: Feb. 14, 2013

(65) Prior Publication Data
US 2013/0259479 A1 Oct. 3, 2013

(30) Foreign Application Priority Data
Mar. 28, 2012 (JP) ................................. 2012-074636

(51) Int. Cl.
*H04B 10/2507* (2013.01)
*H04B 10/50* (2013.01)

(52) U.S. Cl.
CPC ...... *H04B 10/2507* (2013.01); *H04B 10/2572* (2013.01); *H04B 10/5053* (2013.01)

(58) Field of Classification Search
CPC .. H04J 14/06; H04B 10/50575; H04B 10/564; H04B 10/5053
USPC .................................. 398/162, 184, 213, 195
See application file for complete search history.

(56) References Cited

U.S. PATENT DOCUMENTS

| 7,113,700 | B2* | 9/2006 | Shimizu et al. ................ 398/33 |
| 8,364,038 | B2 | 1/2013 | Mizuguchi et al. | |
| 2011/0026935 | A1 | 2/2011 | Akiyama et al. | |
| 2011/0044702 | A1* | 2/2011 | Mizuguchi et al. .......... 398/184 |

(Continued)

FOREIGN PATENT DOCUMENTS

| JP | 2011-028087 | 2/2011 |
| JP | 2011-044906 | 3/2011 |

(Continued)

OTHER PUBLICATIONS

JPOA—Office Action of Japanese Patent Application No. 2012-074636 dated Jan. 19, 2016, with English translation of the relevant part, p. 1, line 22 to p. 3, line 21 of the Office Action.

*Primary Examiner* — Shi K Li
*Assistant Examiner* — Mina Shalaby
(74) *Attorney, Agent, or Firm* — Fujitsu Patent Center

(57) ABSTRACT

An optical transceiving apparatus includes an optical transmitting device performing polarization multiplexing on and transmitting as polarization multiplexed signal light, a first signal light of a predetermined polarization direction and a second signal light of a polarization direction different from the predetermined polarization direction; an optical receiving device receiving the signal light transmitted from the optical transmitting device through an optical transmission path; an acquiring unit acquiring information indicative of magnitude relation of intensity between the first signal light and the second signal light included in the signal light received by the optical receiving device; and a control unit controlling the magnitude relation of intensity between the first signal light and the second signal light included in the signal light output from the optical transmitting device, to be opposite to the magnitude relation indicated by the information acquired by the acquiring unit.

9 Claims, 27 Drawing Sheets

(56) References Cited

U.S. PATENT DOCUMENTS

2011/0076020 A1* 3/2011 Nilsson .............. H04B 10/0775
  398/65
2012/0063783 A1* 3/2012 Vassilieva et al. ............. 398/81

FOREIGN PATENT DOCUMENTS

| | | | |
|---|---|---|---|
| JP | 2011-250037 | 12/2011 | |
| JP | 2011-250037(A) | * 12/2011 | ......... H04B 10/0775 |
| JP | 2012-004691 | 1/2012 | |

* cited by examiner

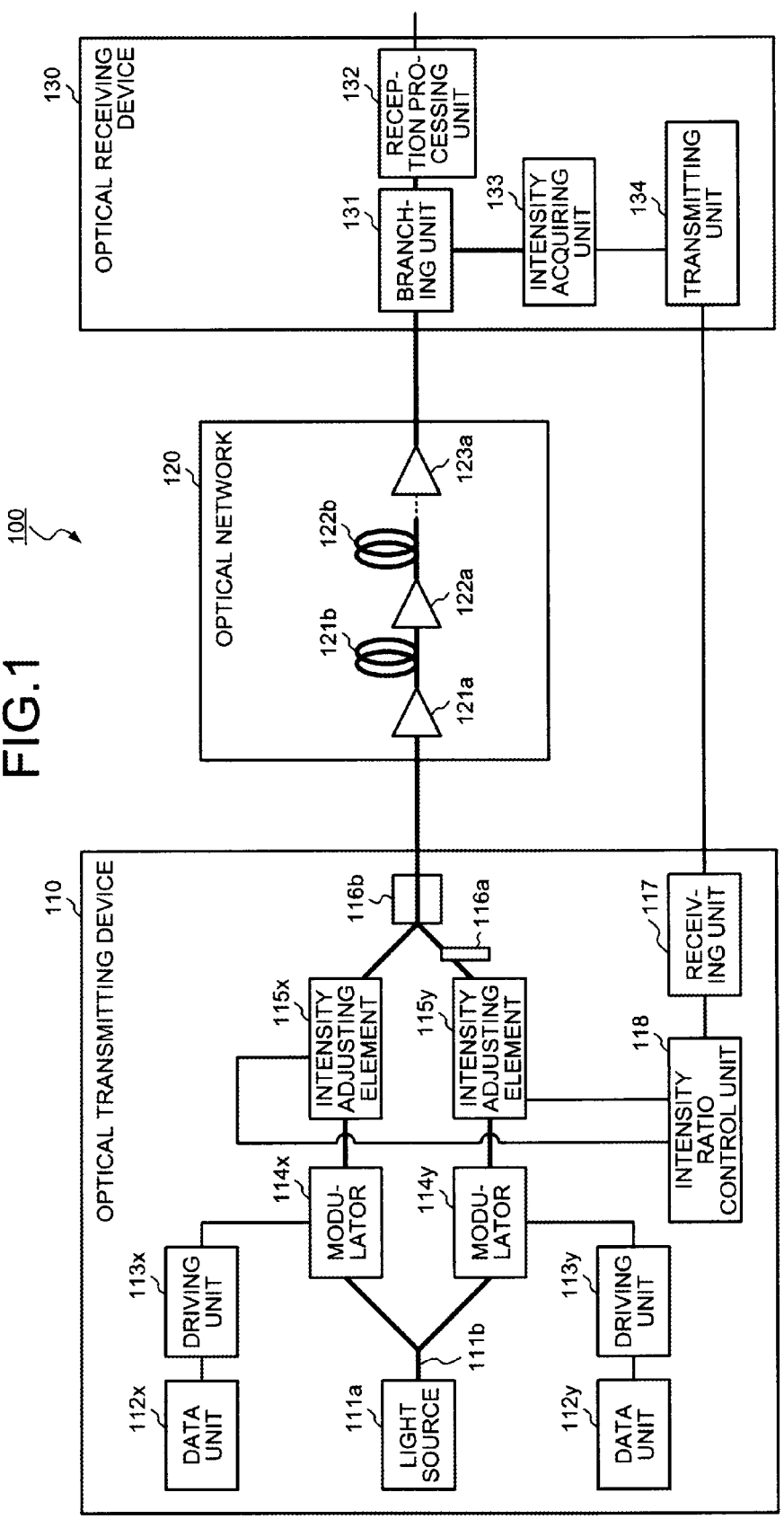

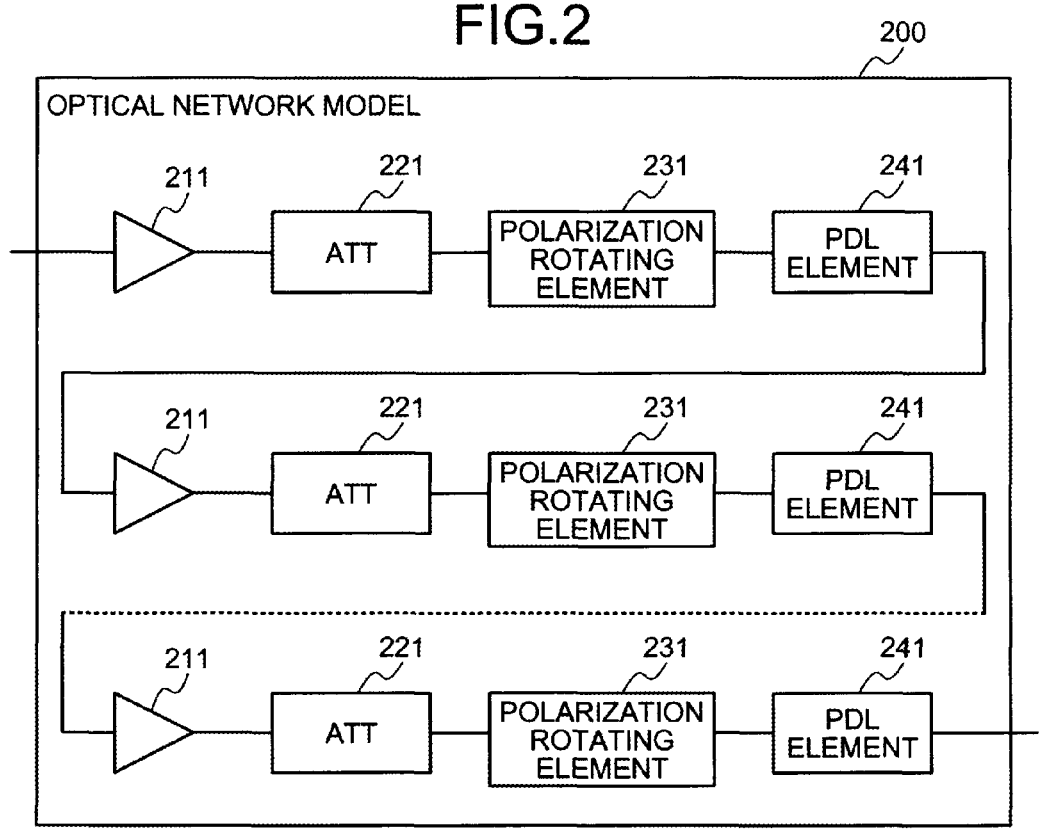
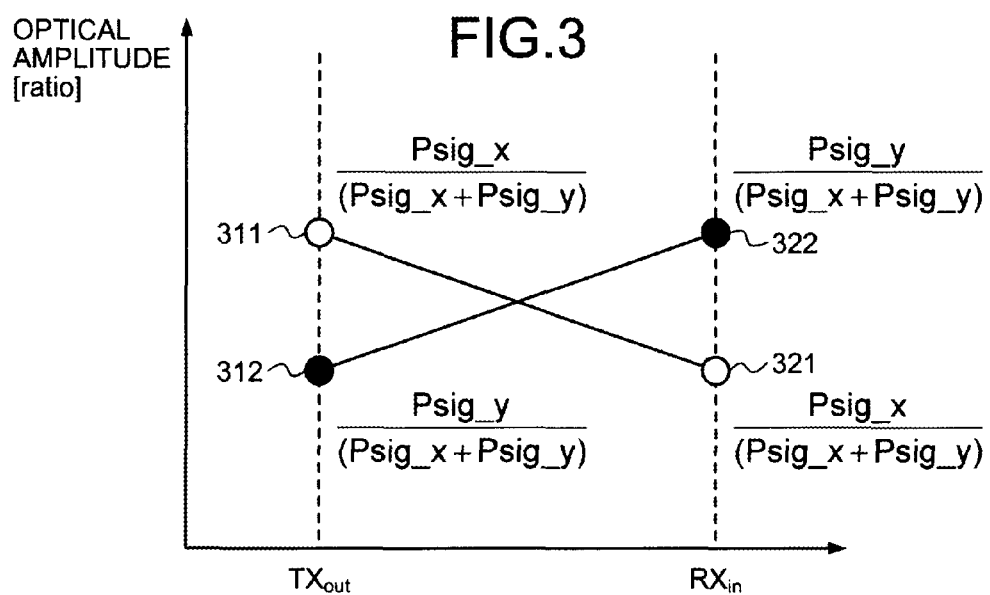

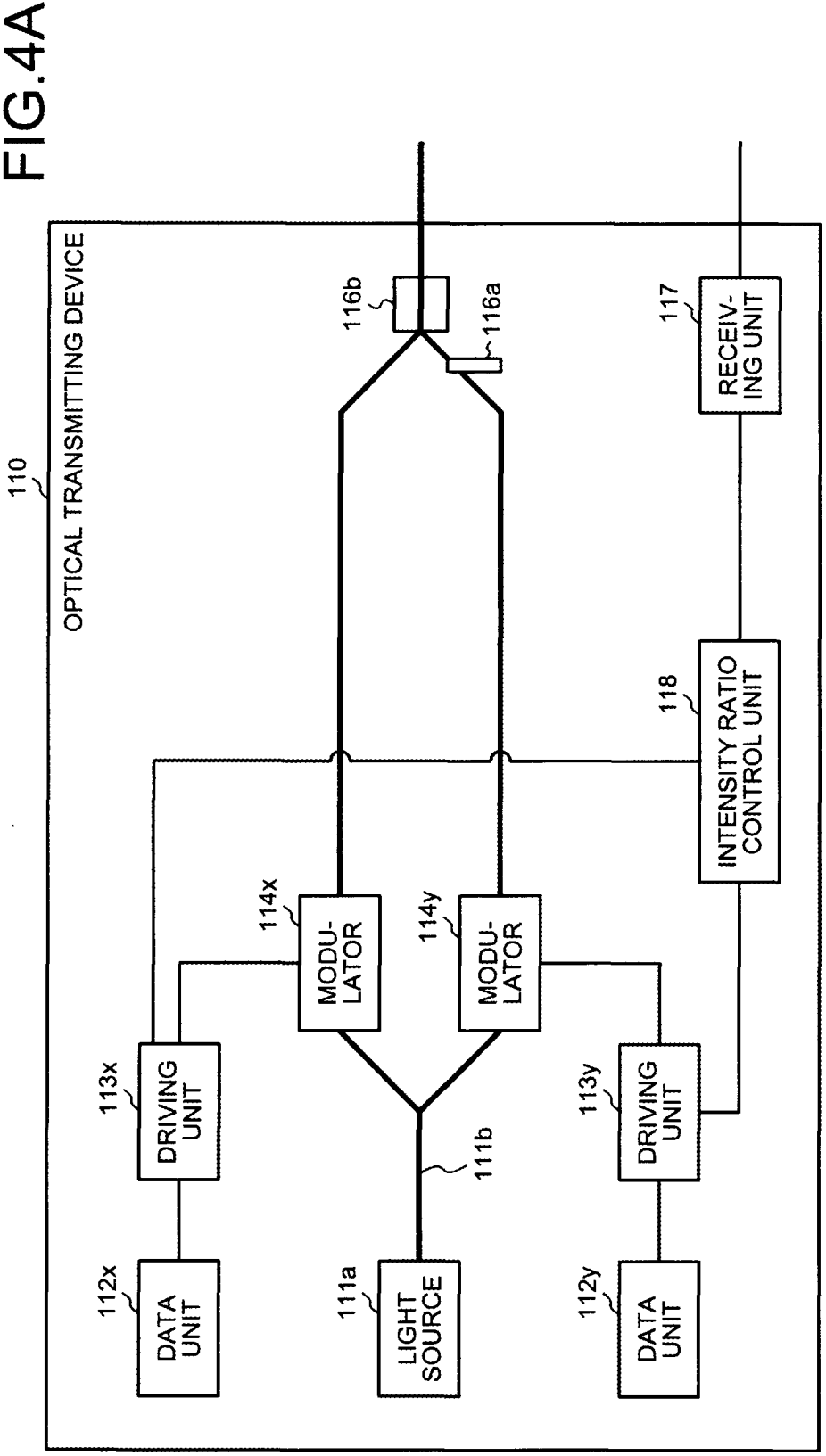

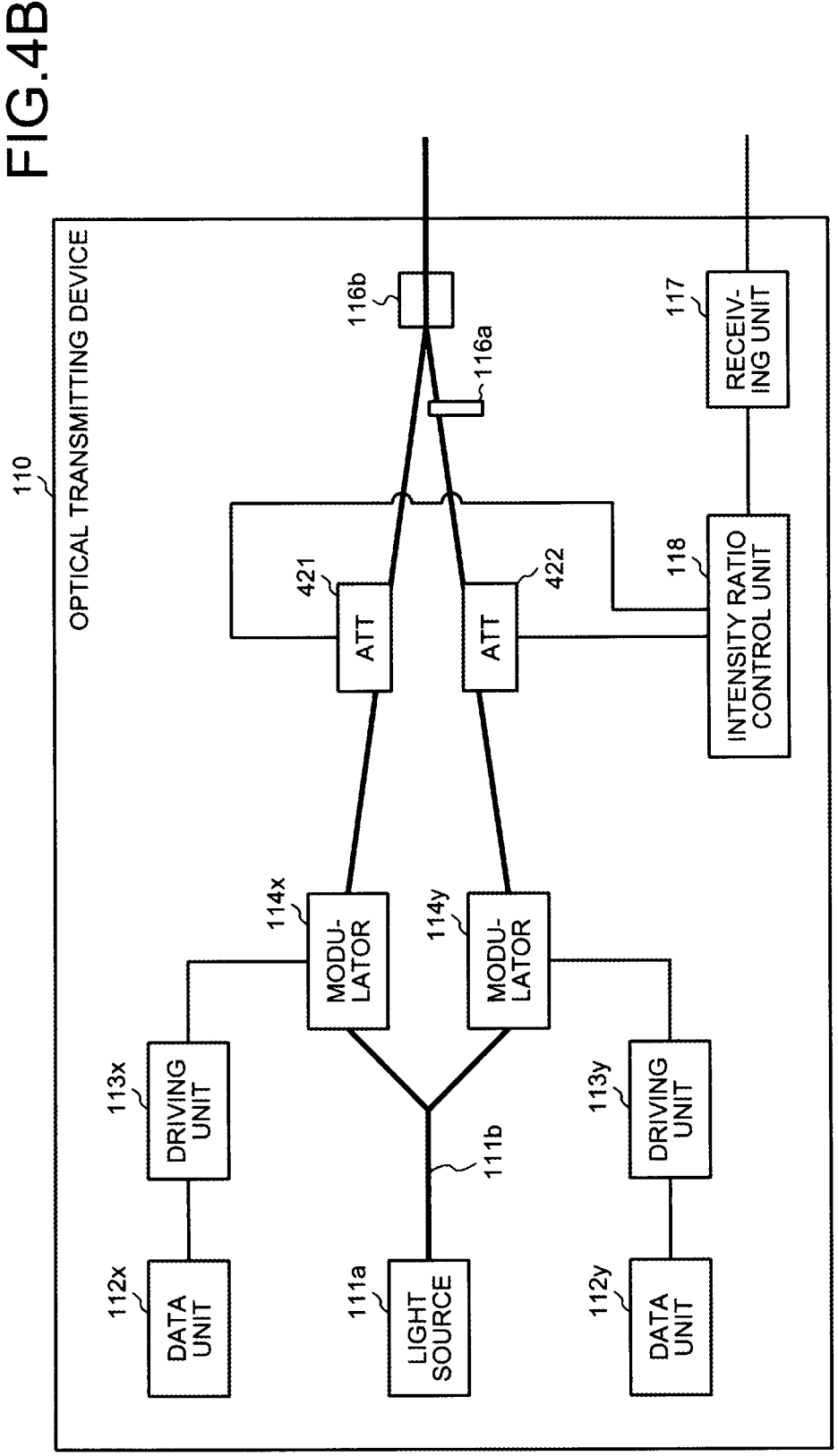

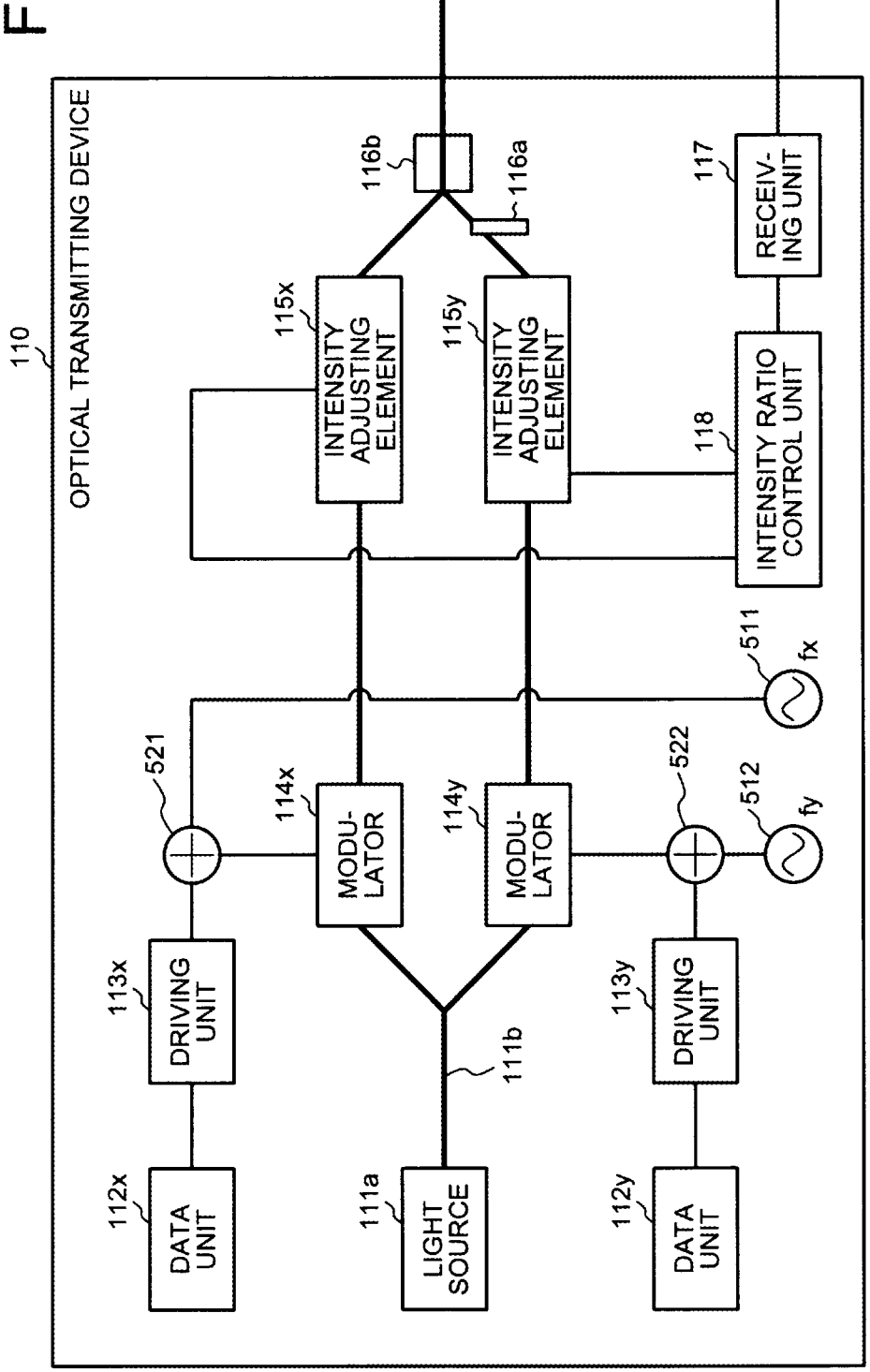

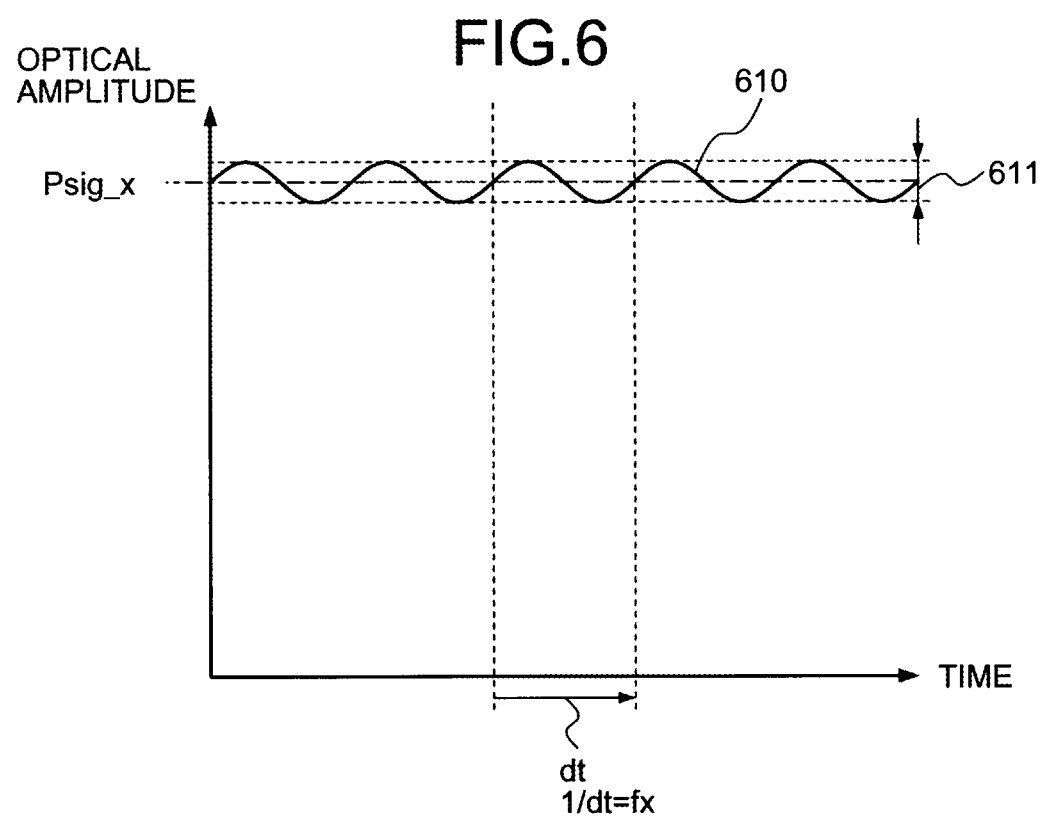

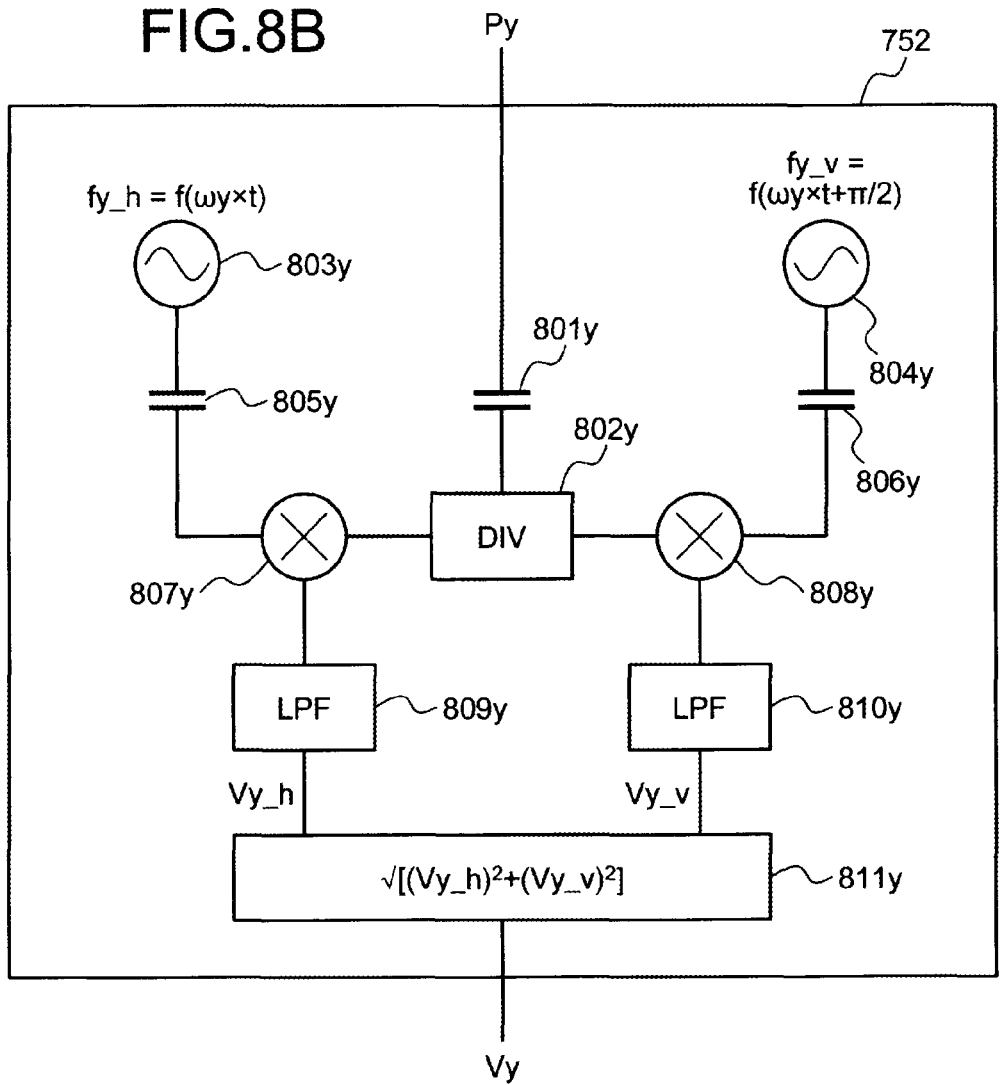

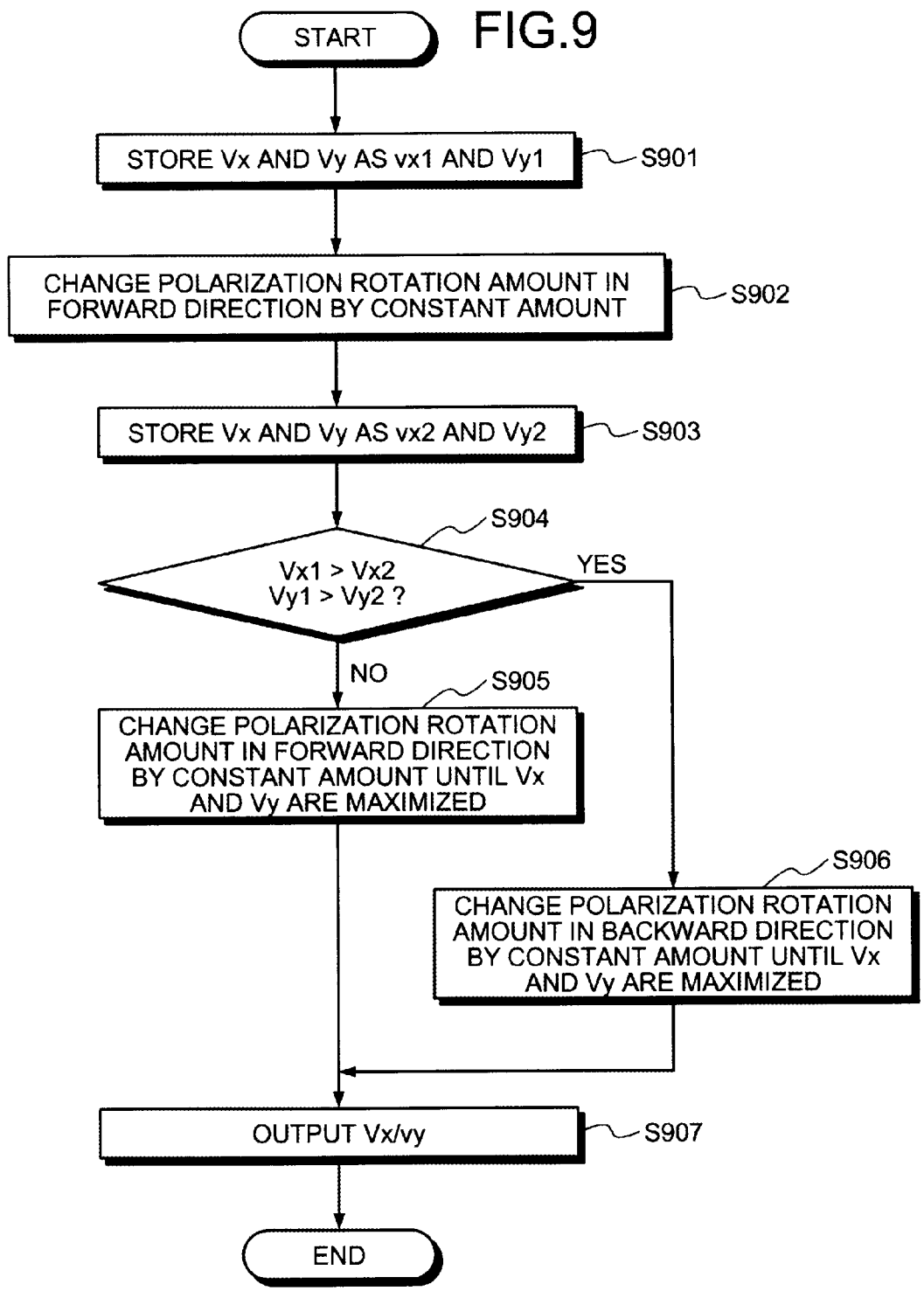

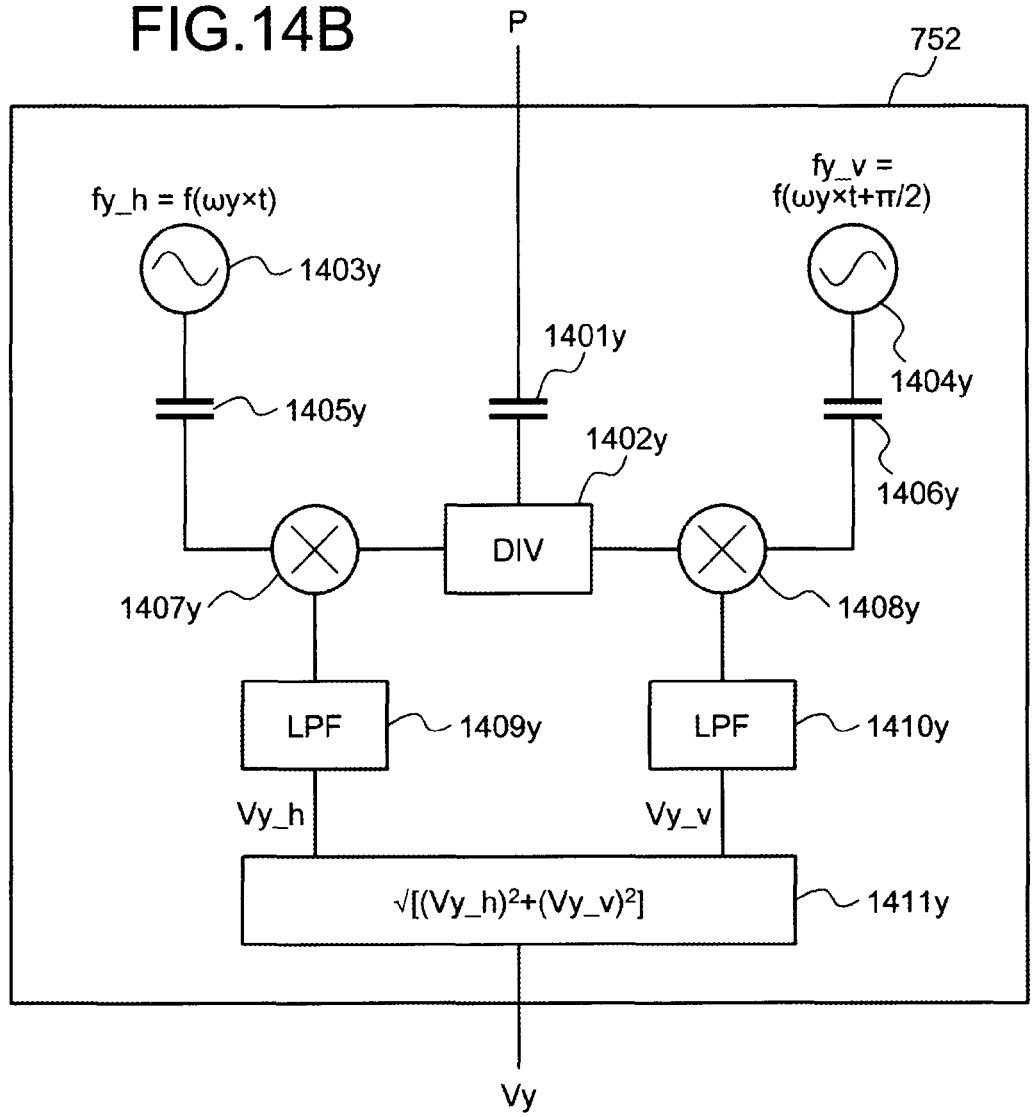

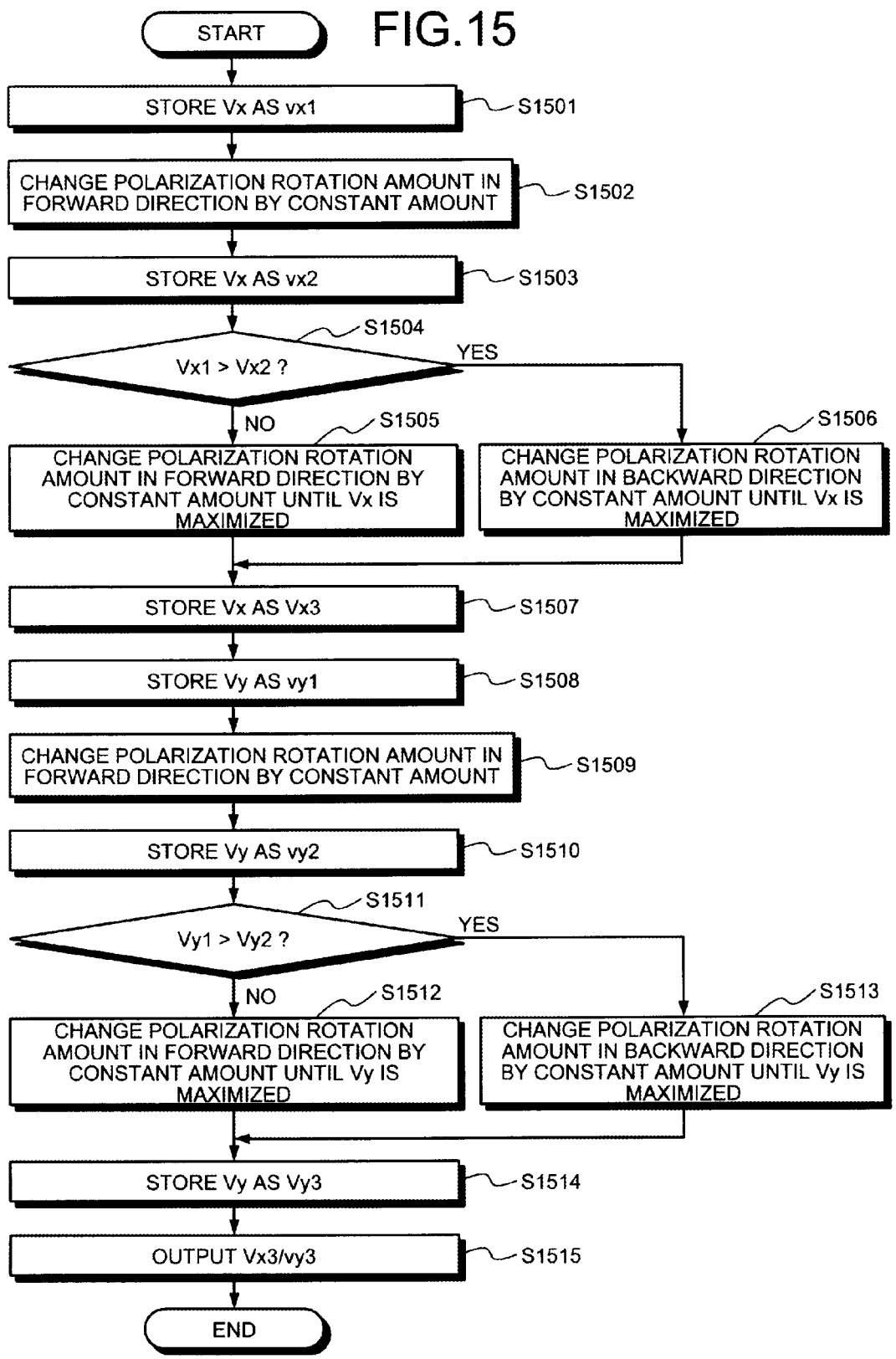

POLARIZER OUTPUT INTENSITY

POLARIZER OUTPUT INTENSITY

POLARIZER OUTPUT INTENSITY

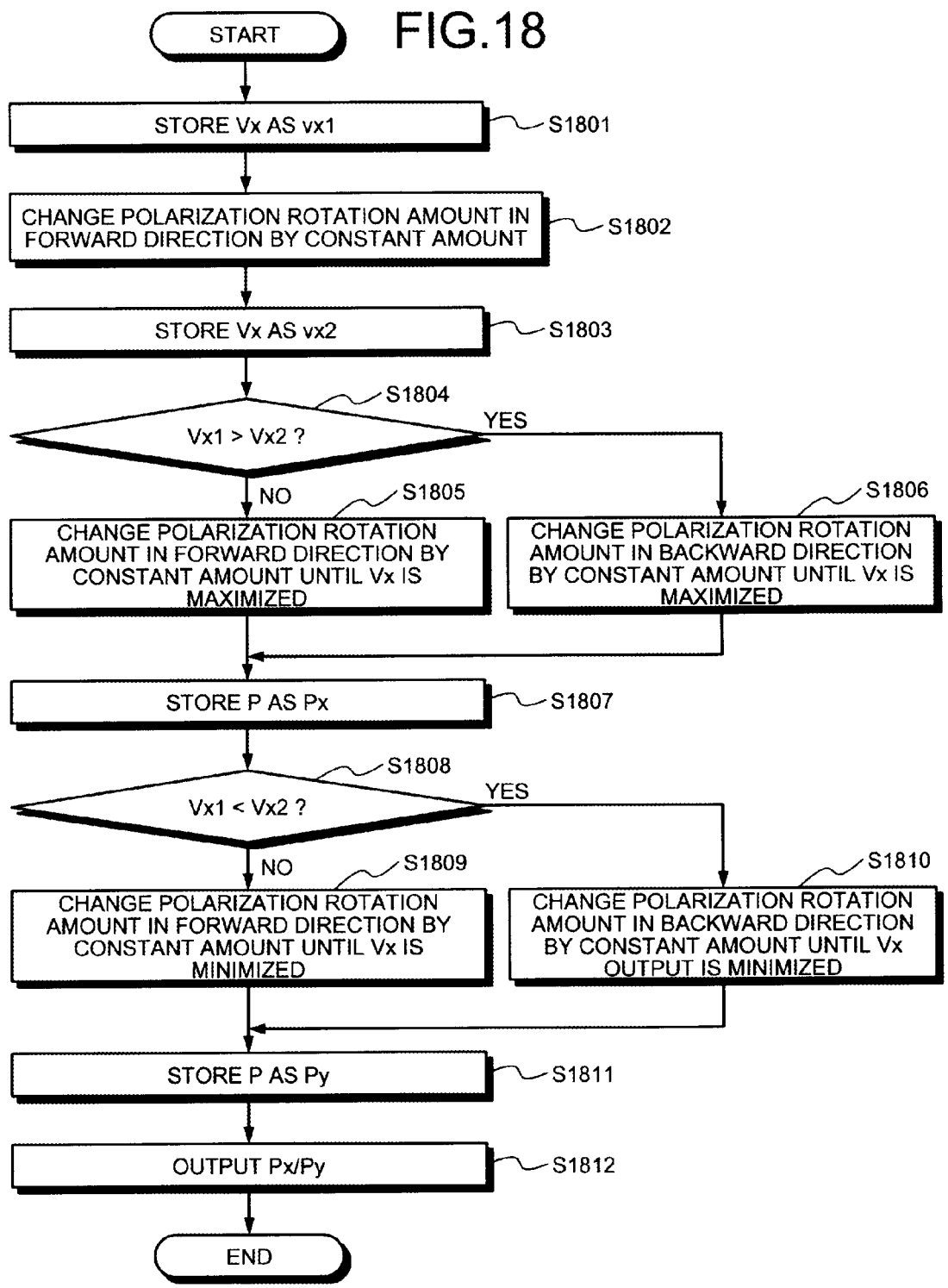

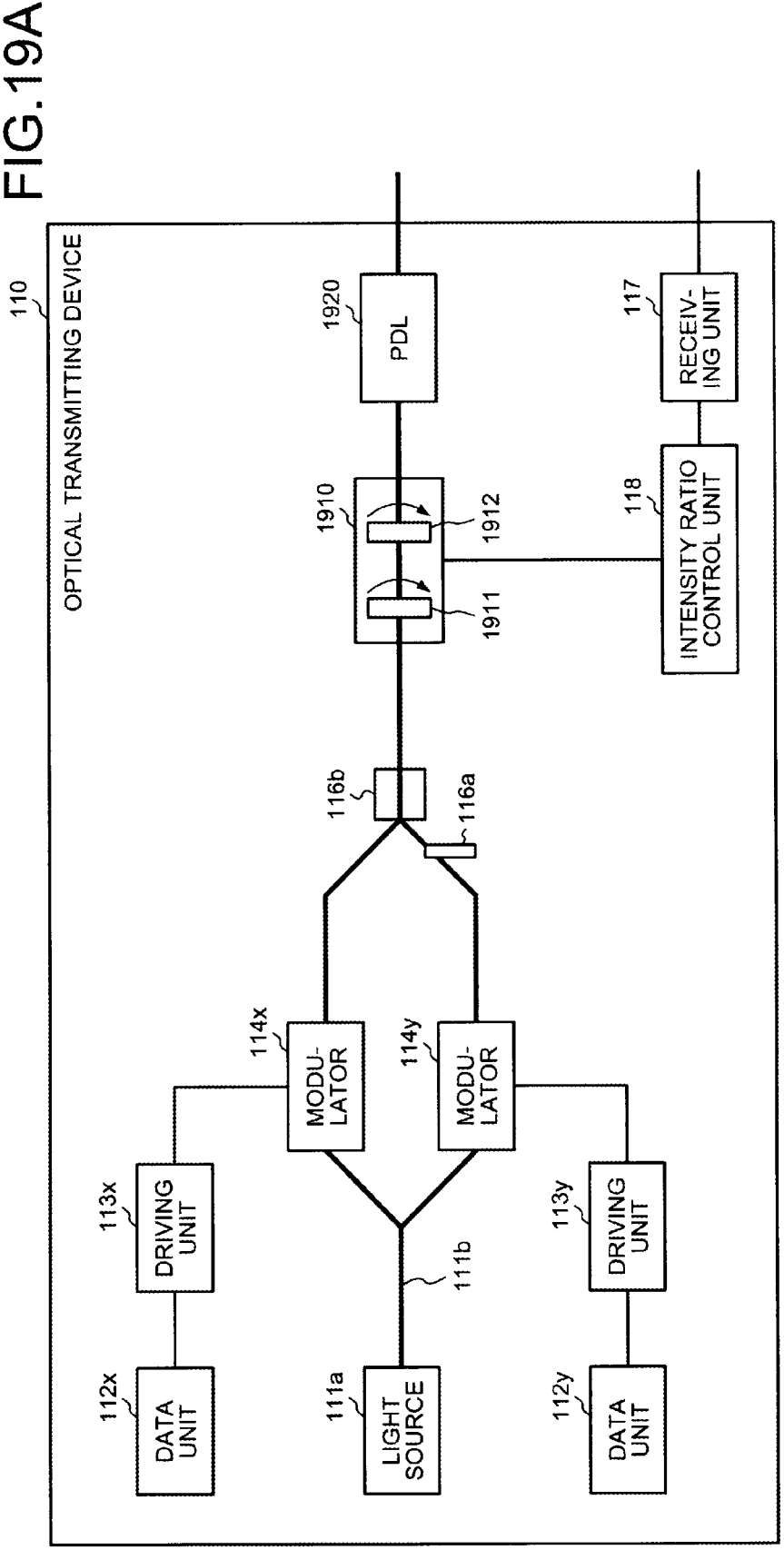

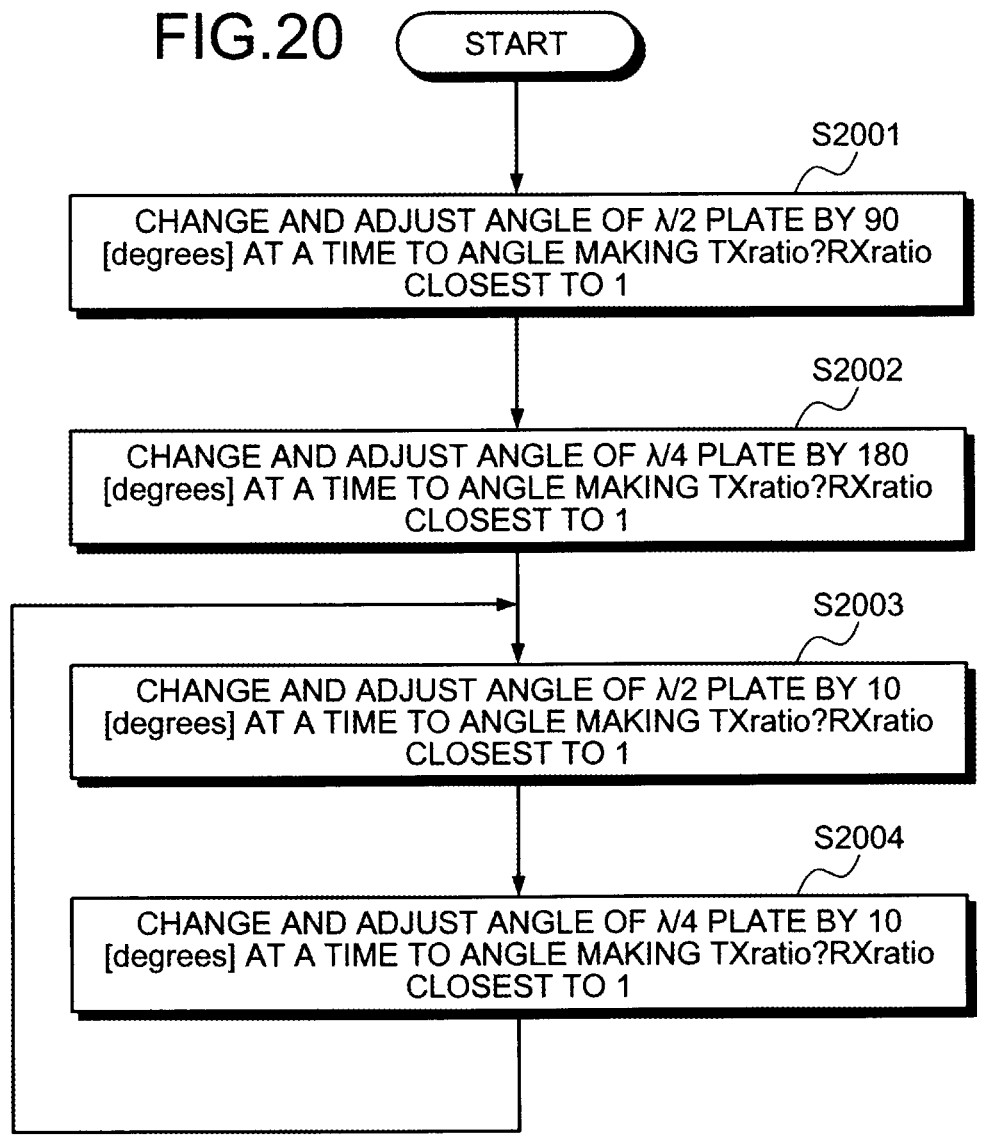

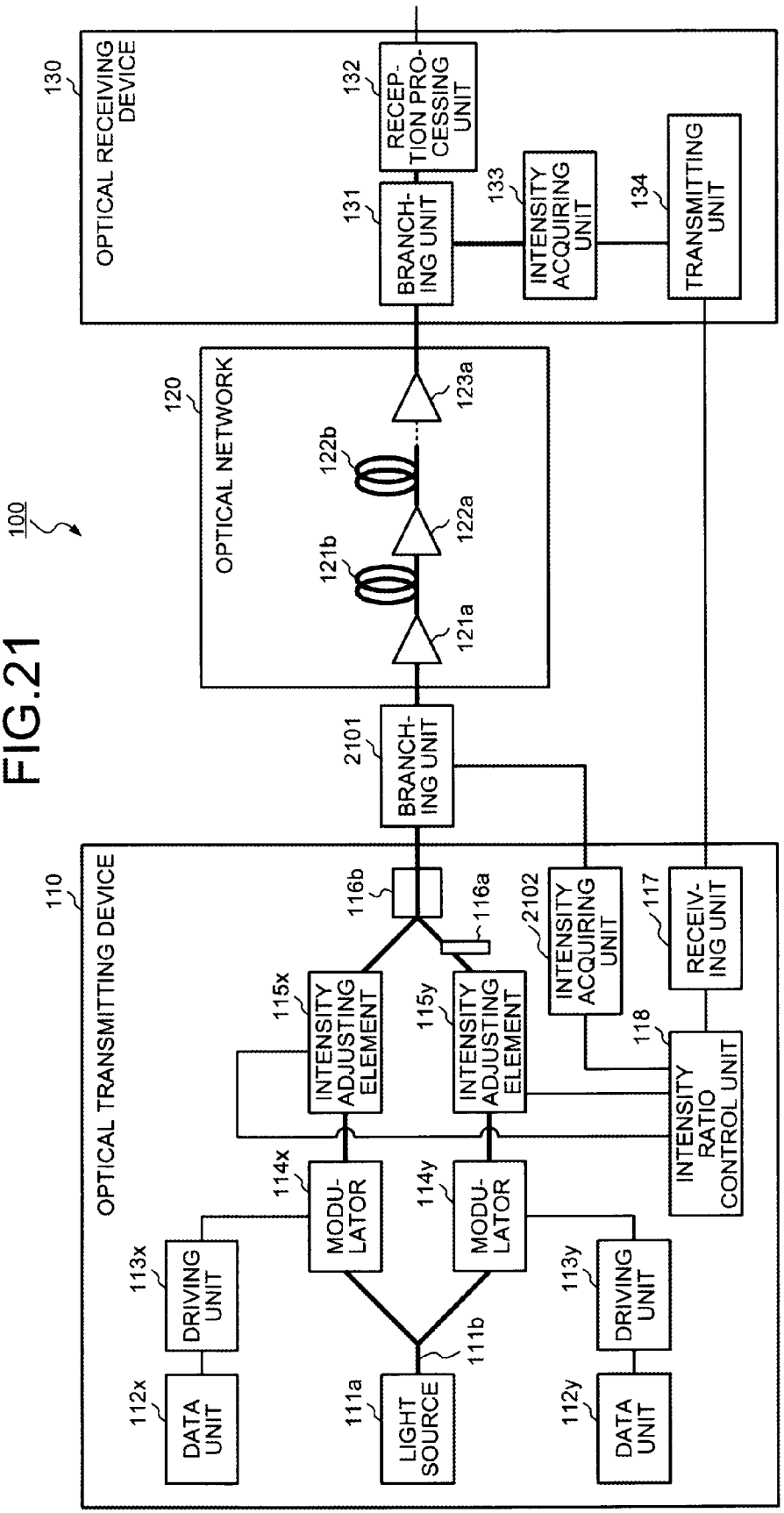

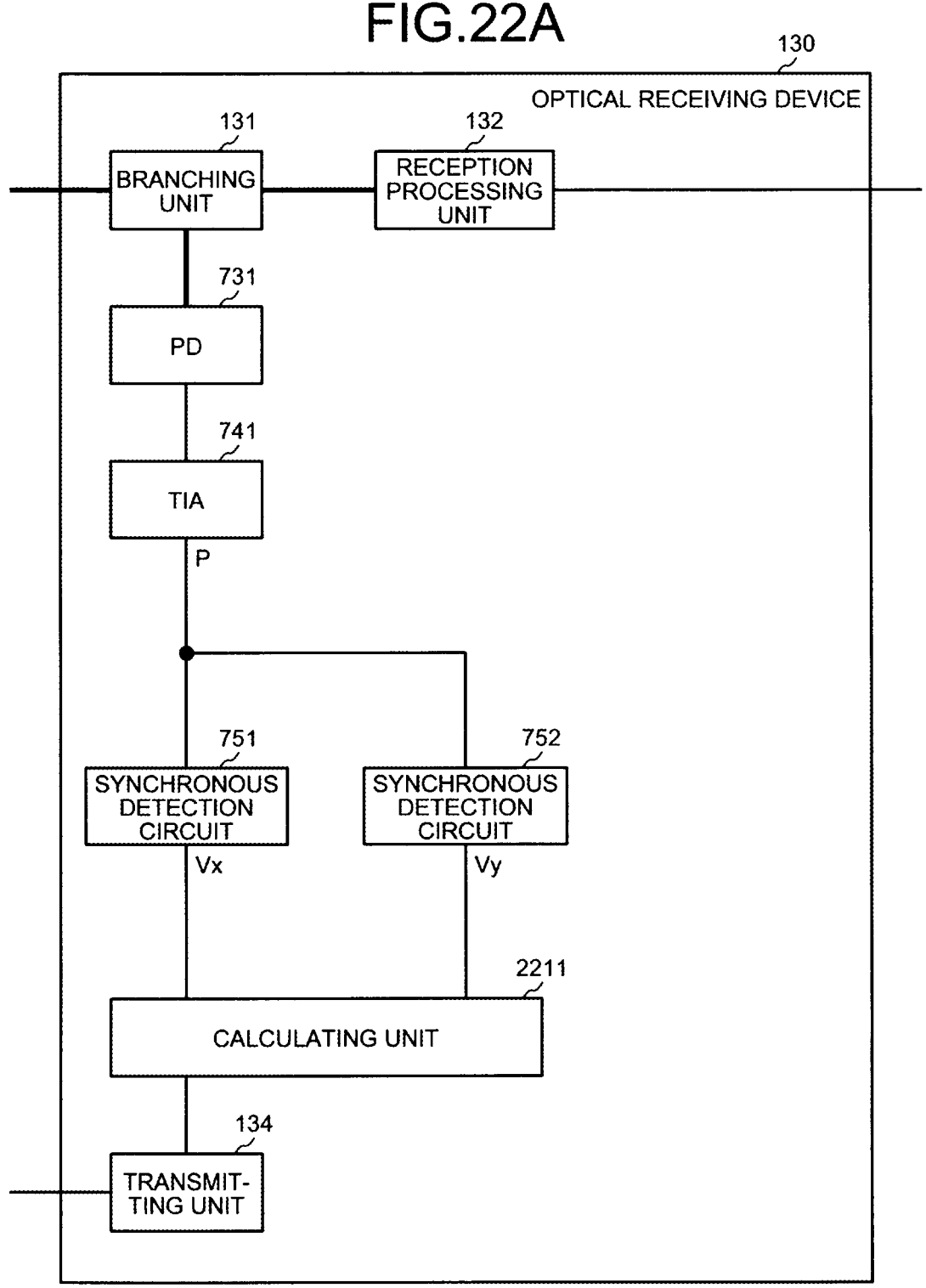

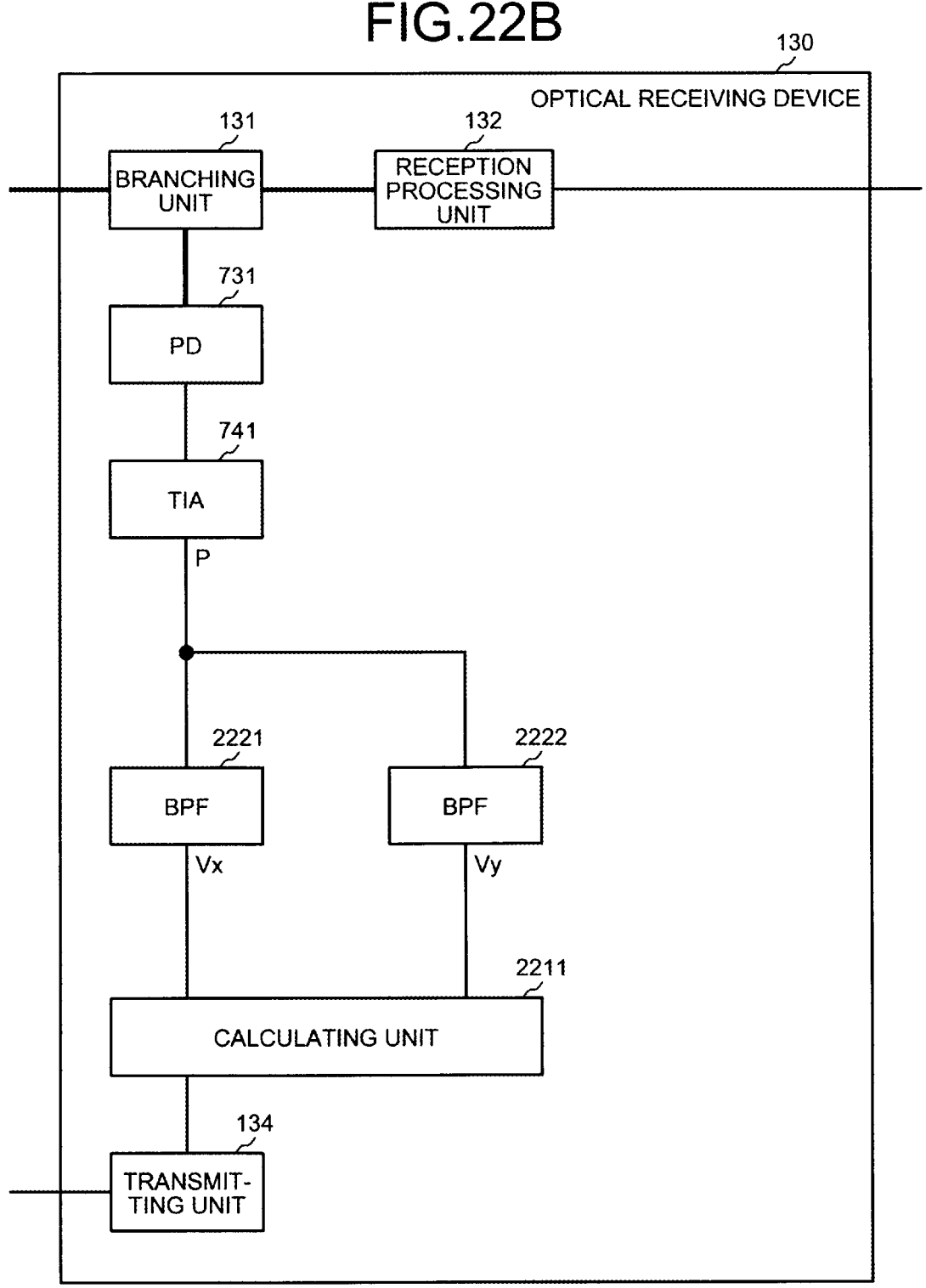

OPTICAL TRANSCEIVING APPARATUS, OPTICAL TRANSMITTING METHOD, AND OPTICAL TRANSMITTING DEVICE

CROSS REFERENCE TO RELATED APPLICATIONS

This application is based upon and claims the benefit of priority of the prior Japanese Patent Application No. 2012-074636, filed on Mar. 28, 2012, the entire contents of which are incorporated herein by reference.

FIELD

The embodiments discussed herein are related to an optical transceiving apparatus, an optical transmitting method, and an optical transmitting device.

BACKGROUND

Demand for high-speed optical transceiving apparatuses is increasing. For example, an optical phase modulation mode is known as a mode for increasing the multiplicity of a single signal. For example, Quadrature Phase Shift Keying (QPSK) using four-valued phase modulation is conventionally applied to an optical transceiving apparatus.

For faster transmission of transmission signals, an optical polarization multiplexing technique is being developed. The optical polarization multiplex is a mode utilizing two polarized waves having the same wavelengths and orthogonal to each other, for example. A technique is known that reduces an intensity deviation between polarized waves of signal light transmitted from an optical transmitting device of a polarization multiplexed optical transceiving apparatus (see, e.g., Japanese Laid-Open Patent Publication Nos. 2011-44906 and 2011-28087).

However, the conventional techniques have a problem of deterioration in transmission characteristics due to deviation of optical signal-noise ratio (OSNR) between polarized waves even when intensity deviation between polarized waves is reduced.

SUMMARY

According to an aspect of an embodiment, an optical transceiving apparatus includes an optical transmitting device performing polarization multiplexing on and transmitting as polarization multiplexed signal light, a first signal light of a predetermined polarization direction and a second signal light of a polarization direction different from the predetermined polarization direction; an optical receiving device receiving the signal light transmitted from the optical transmitting device through an optical transmission path; an acquiring unit acquiring information indicative of magnitude relation of intensity between the first signal light and the second signal light included in the signal light received by the optical receiving device; and a control unit controlling the magnitude relation of intensity between the first signal light and the second signal light included in the signal light output from the optical transmitting device, to be opposite to the magnitude relation indicated by the information acquired by the acquiring unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram of an example of an optical transceiving apparatus according to an embodiment;

FIG. 2 is a diagram of an example of an optical network model representing characteristics of an optical network;

FIG. 3 is a diagram of an example of intensity control between polarized waves;

FIG. 4A is a diagram of a first example of configuration of an optical transmitting device according to the embodiment;

FIG. 4B is a diagram of a modification of the optical transmitting device depicted in FIG. 4A;

FIG. 5A is a second example of configuration of the optical transmitting device according to the embodiment;

FIG. 6 is a diagram of an example of signal light onto which a low frequency signal has been superimposed;

FIG. 8B is a diagram of an example of a configuration of a synchronous detection circuit (Y-polarization) depicted in FIG. 7;

FIG. 9 is a flowchart of an operation example of a control calculating unit depicted in FIG. 7;

FIG. 14B is a diagram of an example of a configuration of the synchronous detection circuit (Y-polarization) depicted in FIG. 13;

FIG. 15 is a flowchart of an operation example of the control calculating unit depicted in FIG. 13;

FIG. 18 is a flowchart of an operation example of the control calculating unit depicted in FIG. 17;

FIG. 19A is a diagram of a third example of configuration of the optical transmitting device according to the embodiment;

FIG. 20 is a flowchart of an example of operation of an intensity ratio control unit depicted in FIGS. 19A and 19B;

FIG. 21 is a diagram of an example of the optical transceiving apparatus depicted in FIG. 1;

FIG. 22A is a diagram of a first example of configuration of the optical receiving device depicted in FIG. 21; and FIG. 22B is a diagram of a second example of configuration of the optical receiving device depicted in FIG. 21.

DESCRIPTION OF EMBODIMENTS

Figure 5B:
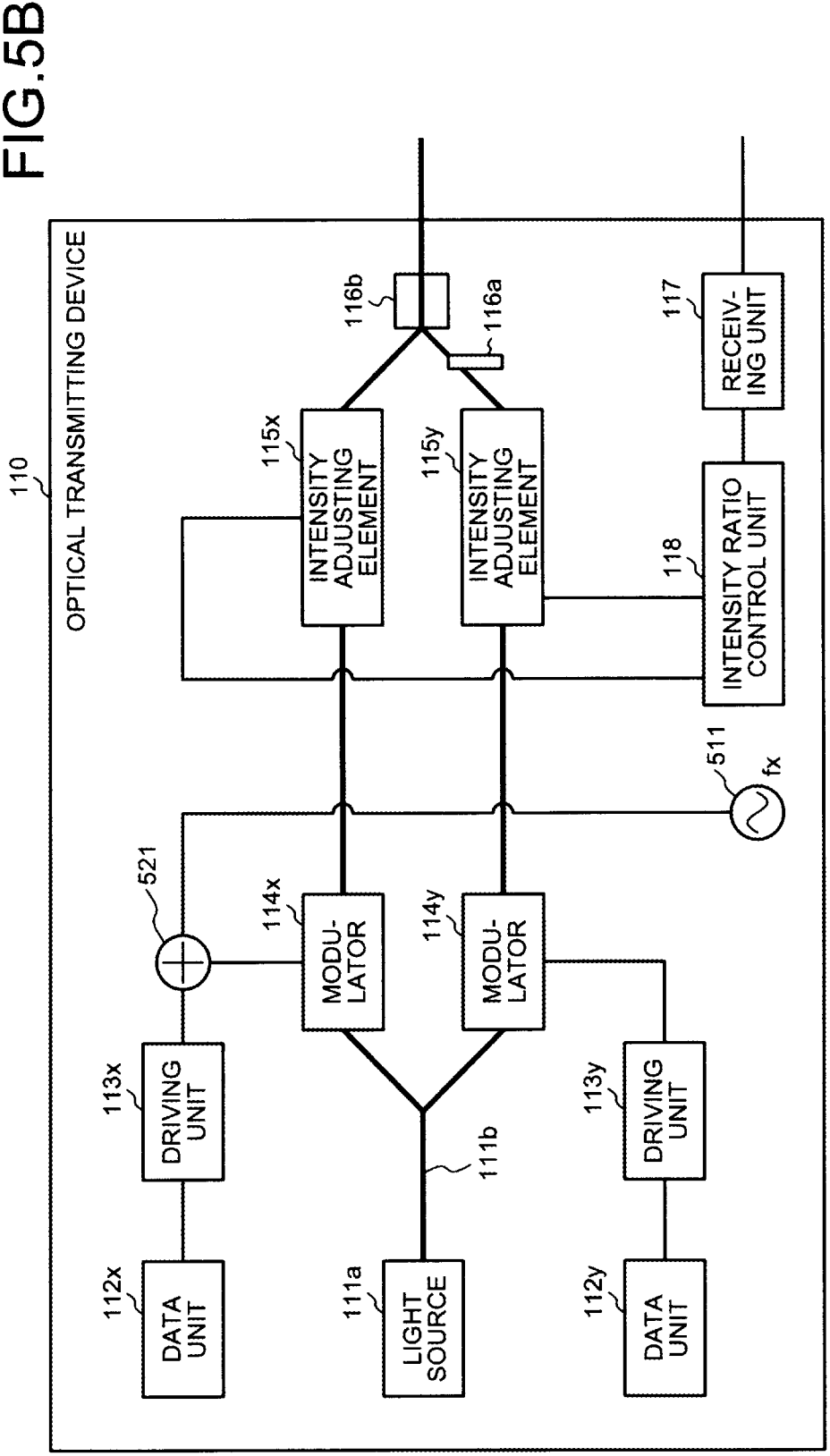
FIG. 5B is a diagram of a modification of the optical transmitting device depicted in FIG. 5A.

Preferred embodiments of the present invention will be explained with reference to the accompanying drawings.

FIG. 1 is a diagram of an example of an optical transceiving apparatus according to an embodiment. As depicted in FIG. 1, an optical transceiving apparatus 100 according to the embodiment is an optical transmission system that includes an optical transmitting device 110, an optical network 120, and an optical receiving device 130. The optical transmitting device 110 transmits signal light polarization-multiplexed by an X-polarized wave and a Y-polarized wave orthogonal to each other via the optical network 120 to the optical receiving device 130.

The optical transmitting device 110 includes a light source 111a, a branching unit 111b, data units 112x, 112y, driving units 113x, 113y, modulators 114x, 114y, intensity adjusting elements 115x, 115y, a polarization adjusting unit 116a, and a coupler 116b. The optical transmitting device 110 includes a receiving unit 117 and an intensity ratio control unit 118.

The light source 111a generates and emits light to the branching unit 111b. The light emitted by the light source 111a is linearly-polarized (e.g., X-polarized) continuous wave (CW) light. The branching unit 111b branches the light emitted from the light source 111a and emits the respective light branches to the modulators 114x and 114y.

The data unit 112x generates data to be transmitted by the X-polarized wave and outputs the generated data to the driving unit 113x. The data unit 112y generates data to be transmitted by the Y-polarized wave and outputs the generated data to the driving unit 113y.

The driving unit 113x outputs to the modulator 114x, a drive voltage according to the data output from the data unit 112x. The driving unit 113y outputs to the modulator 114y a drive voltage according to the data output from the data unit 112y.

The modulator 114x modulates according to the drive voltage output from the driving unit 113x, the light emitted from the branching unit 111b. The modulator 114x emits the modulated signal light to the intensity adjusting element 115x. The modulator 114y modulates according to the drive voltage output from the driving unit 113y, the light emitted from the branching unit 111b. The modulator 114y emits the modulated signal light to the intensity adjusting element 115y.

The intensity adjusting element 115x adjusts the intensity of the signal light emitted from the modulator 114x and emits the intensity-adjusted signal light to the coupler 116b. The intensity adjusting element 115y adjusts the intensity of the signal light emitted from the modulator 114y and emits the intensity-adjusted signal light to the polarization adjusting unit 116a. Each of the intensity adjusting elements 115x and 115y can be implemented by an attenuator attenuating the signal light with a variable amount of attenuation or an amplifier amplifying the signal light with a variable amount of amplification, for example.

The polarization adjusting unit 116a adjusts the polarization direction of the signal light emitted from the intensity adjusting element 115y and emits to the coupler 116b, the signal light with the polarization direction adjusted. The adjustment of the polarization direction by the polarization adjusting unit 116a is performed such that the signal light emitted from the intensity adjusting element 115x and the signal light emitted from the polarization adjusting unit 116a to the coupler 116b are X-polarized and Y-polarized, respectively.

For example, if the light source 111a emits X-polarized signal light, the polarization adjusting unit 116a can be a ½ wavelength plate rotating the polarization direction of the signal light emitted from the intensity adjusting element 115y by 90 degrees. As a result, the X-polarized signal light emitted from the intensity adjusting element 115y can be converted into the Y-polarized signal light.

Although the polarization adjusting unit 116a is disposed downstream from the intensity adjusting element 115y in the example depicted in FIG. 1, the polarization adjusting unit 116a may be disposed downstream from the intensity adjusting element 115x. Alternatively, wavelength plates rotating a polarization direction by 45 degrees to opposite directions may be disposed as the polarization adjusting units 116a downstream from the intensity adjusting elements 115x and 115y. The polarization adjusting unit 116a may be disposed between the branching unit 111b and the modulators 114x, 114y or between the modulators 114x, 114y and the intensity adjusting elements 115x, 115y.

The coupler 116b is a polarization multiplexing unit combining the X-polarized signal light (first signal light) emitted from the intensity adjusting element 115x and the Y-polarized signal light (second signal light) emitted from the polarization adjusting unit 116a. As a result, the X-polarized signal light and the Y-polarized signal light are polarization-multiplexed. The coupler 116b sends out the polarization-multiplexed signal light to the optical network 120.

The receiving unit 117 receives reception intensity ratio information transmitted from the optical receiving device 130. The reception intensity ratio information is information enabling identification of an intensity ratio (a ratio of intensity) between an X-polarized component and a Y-polarized component included in the signal light received by the optical receiving device 130. The receiving unit 117 outputs the received reception intensity ratio information to the intensity ratio control unit 118.

The intensity ratio control unit 118 controls the adjustment of intensity of signal light in the intensity adjusting elements 115x and 115y based on the reception intensity ratio information output from the receiving unit 117. For example, the intensity ratio control unit 118 respectively controls the amount of attenuation in the intensity adjusting elements 115x and 115y. For example, the intensity ratio control unit 118 provides control such that a constant value (e.g., 1) is acquired as a product of the intensity ratio between the X-polarized component and the Y-polarized component included in the signal light transmitted from the optical transmitting device 110 and the intensity ratio between the X-polarized component and the Y-polarized component included in the signal light received by the optical receiving device 130.

Although the example depicted in FIG. 1 is configured with the intensity adjusting elements 115x and 115y respectively disposed on the path of the X-polarized wave and the path of the Y-polarized wave, the intensity adjusting element can be disposed on at least one of the paths of the X-polarized wave and the Y-polarized wave, thereby enabling the adjustment of the intensity ratio between the X-polarized component and the Y-polarized component included in the signal light transmitted from the optical transmitting device 110.

The optical network 120 is an optical transmission path transmitting the signal light from the optical transmitting device 110 to the optical receiving device 130. The optical network 120 includes optical amplifiers 121*a*, 122*a*, 123*a*, . . . amplifying the signal light transmitted therethrough and optical fibers 121*b*, 122*b*, 123*b*, . . . . The optical network 120 is an optical transmission path having polarization dependent loss (PDL).

The optical receiving device 130 includes a branching unit 131, a reception processing unit 132, an intensity acquiring unit 133, and a transmitting unit 134. The branching unit 131 is an intensity coupler that branches the signal light sent out from the optical network 120. The branching unit 131 emits the signal light branches to the reception processing unit 132 and the intensity acquiring unit 133. The reception processing unit 132 executes a reception process for the signal light emitted from the branching unit 131 and outputs data acquired by the reception process.

The intensity acquiring unit 133 acquires the reception intensity ratio information enabling identification of an intensity ratio between the X-polarized component and the Y-polarized component included in the signal light emitted from the branching unit 131 and outputs the acquired reception intensity ratio information to the transmitting unit 134. For example, the intensity acquiring unit 133 measures the intensities of the X-polarized component and the Y-polarized component included in the signal light emitted from the branching unit 131. The intensity acquiring unit 133 calculates a ratio of the measured intensities and outputs to the transmitting unit 134, information indicative of the calculated ratio as the reception intensity ratio information. Alternatively, the intensity acquiring unit 133 may output to the transmitting unit 134, information indicative of the measured intensities as the reception intensity ratio information.

The transmitting unit 134 transmits the reception intensity ratio information output from the intensity acquiring unit 133 to the optical transmitting device 110. The transmission of the reception intensity ratio information from the transmitting unit 134 to the optical transmitting device 110 can be implemented by using various communication modes, for example, wired communication and wireless communication such as optical communication and electronic communication. The amount of delay in the transmission of the reception intensity ratio information from the transmitting unit 134 to the optical transmitting device 110 is preferably reduced to a negligible level in terms of a loop response speed of feedback control using the reception intensity ratio information.

Although the receiving unit 117 and the intensity ratio control unit 118 are disposed in the optical transmitting device 110 in the description of the example depicted in FIG. 1, the receiving unit 117 and the intensity ratio control unit 118 may be disposed external to the optical transmitting device 110. Although the intensity acquiring unit 133 and the transmitting unit 134 are disposed in the optical receiving device 130, the intensity acquiring unit 133 and the transmitting unit 134 may be disposed external to the optical receiving device 130.

Although the intensity ratio control unit 118 is disposed in the optical transmitting device 110 in the description of the example depicted in FIG. 1, the intensity ratio control unit 118 may be disposed in the optical receiving device 130. In this case, the intensity ratio control unit 118 transmits a control signal via the transmitting unit 134 and the receiving unit 117 to control the intensity adjusting elements 115*x* and 115*y*. The intensity ratio control unit 118 may be disposed in a network management system (NMS), etc.

For the feedback control using the reception intensity ratio information by the intensity ratio control unit 118, for example, proportional integral differential (PID) control, etc. may be used.

Deterioration of transmission characteristics due to deviation of OSNR between polarized waves will be described. It is known that polarization dependent loss (PDL) occurs in an optical fiber transmission path. For example, transmission characteristics of an optical fiber itself, a splice portion in the case of a repaired broken wire, etc. and a coupler or isolator in an optical amplifier disposed in a transmission line are known as causes of the PDL.

It is also known that amplified spontaneous emission (ASE) optical noise added by an optical amplifier of an optical fiber transmission path is dependent on intensity input to the optical amplifier. Therefore, if a difference in signal light intensity is generated between polarized waves in an optical fiber transmission path, OSNR is biased between the two polarized waves of polarization multiplexed signals.

If the OSNR of one polarized signal is more deteriorated than the OSNR of the other, overall signal quality of polarization multiplexed signal light is hampered by the polarized signal with the more deteriorated OSNR, making it difficult to extend a transmission distance. This is because a typical polarization multiplexed optical transceiving apparatus has the same signal source (line) for the X-polarized wave and the Y-polarized wave of signals rather than separated signal sources and is configured with one signal source divided into two signals, which are used as respective polarized signals. In this case, for example, if one polarized signal is less deteriorated in OSNR while the other polarized signal is considerably deteriorated in OSNR and cannot be identified by the optical receiving device 130, one signal cannot be identified out of two signals divided from one signal source. Therefore, the signal source cannot be transmitted.

The same applies to respective OSNRs of two polarized waves. For example, when OSNRs are 20 [dB] in one polarized signal and 30 [dB] in the other signal, an overall average OSNR of the two polarization multiplexed signals is $10 \times LOG(10^{(20/10)} + 10^{(30/10)}) = 27.4$ [dB]. However, the signal light cannot simply be considered as a signal having the OSNR of 27.4 [dB] and is actually hampered by the poor OSNR of 20 [dB], resulting in a limited transmittable distance.

Therefore, to compensate signal quality of a polarization multiplexed signal, it is preferable to perform transmission such that no bias occurs in OSNR between polarized signals. Although the polarization multiplexed signal light is configured such that intensity is divided into two polarized waves for transmission, if the same intensity is transmitted, the intensity is not concentrated on one polarization plane in the case of transmission of the polarization multiplexed signal light as compared to transmission of a single polarized signal. Therefore, polarization multiplexed signal light is characterized in that signal quality is hardly deteriorated due to the nonlinear effect. However, if an intensity difference occurs between the polarized waves of polarization multiplexed signal light due to PDL in an optical fiber transmission path, a difference in OSNR occurs between the polarized signals and since the intensity of one polarized signal is greater than the intensity of the other, the signal quality is easily deteriorated due to the nonlinear effect.

On the other hand, in the optical transceiving apparatus 100, the magnitude relation of intensity of polarized components on the transmission side is adjusted to be opposite to the magnitude relation of intensity of polarized components measured on the reception side. Therefore, a difference in OSNR between the polarized components can be reduced to improve transmission characteristics.

FIG. 2 is a diagram of an example of an optical network model representing characteristics of an optical network. In the optical network 120 depicted in FIG. 1, for example, the optical amplifiers 121a, 122a, 123a, . . . and the optical fibers 121b, 122b, 123b, . . . are connected in series (e.g., several tens [km]/span). Therefore, the characteristics of the optical network 120 can be represented as an optical network model 200 depicted in FIG. 2. The optical network model 200 is a model focusing on the PDL of the optical network 120.

The optical network model 200 is configured by connecting N sets of optical amplifiers 211, optical attenuators (ATT) 221, polarization rotating elements 231, and PDL elements 241 in series. The optical attenuators 221 and the PDL elements 241 are polarization-independent and polarization-dependent intensity loss elements, respectively.

The optical attenuator 221 is a polarization-independent intensity loss element. The optical attenuator 221 indicates loss of an optical fiber (e.g., the optical fibers 121b, 122b, 123b, . . . ) and corresponds to about −0.2 [dB/km]× transmission distance [km], for example.

The PDL element 241 is a polarization-dependent intensity loss element. The PDL element 241 indicates, for example, an element having a distributed constant on the order of about 0.5 [dB/span] in the case of an optical fiber of a transmission path or elements sparsely present at several locations with a lumped constant on the order of about 0.5 [dB/location] as in the case of a splice, an optical coupler, and an isolator, for example. The polarization rotating element 231 indicates a polarization state varying according to a change in the shape of the optical fiber.

The OSNR of signal light output from the optical amplifier 211 can be expressed by Equation (1), for example. In Equation (1), Psig is intensity [W] of signal light output from the optical amplifier 211 and Psig=G×Pin is satisfied. G is an optical amplification factor of the optical amplifier 211. Pin is intensity [W] of signal light input to the optical amplifier 211.

Pase is intensity [W] of ASE generated and output by the optical amplifier 211. Base is a bandwidth [m] of ASE generated and output by the optical amplifier 211. Bo is a normalization bandwidth [m], for example, 0.1 [nm].

$$OSNR = \frac{Psig}{Pase \times Bo/Base} \quad (1)$$

Assuming that G≈G−1 is satisfied, if G>>1, Equation (1) is expressed by Equation (2). In Equation (2), NF is a noise figure; h is a Planck's constant; and v is a frequency of vibration. The OSNR in Equations (1) and (2) is an antilogarithm ratio of signal light intensity to noise intensity and is 10*LOG(OSNR) when expressed in decibels.

$$OSNR \approx \frac{Pin}{NF \times h \times v \times Bo} \quad (2)$$

Assuming that OSNRs of the N optical amplifiers 211 depicted in FIG. 2 are $OSNR_1$ to $OSNR_N$, an OSNR of signal light relayed by the N optical amplifiers 211 is expressed by Equation (3).

$$\frac{1}{OSNR} = \frac{1}{OSNR_1} + \frac{1}{OSNR_2} + \ldots + \frac{1}{OSNR_N} \quad (3)$$

Based on Equation (2), Equation (3) is expressed by Equation (4).

$$\frac{1}{OSNR} = \frac{NF_1 \times h \times v \times Bo}{Pin_1} + \frac{NF_2 \times h \times v \times Bo}{Pin_2} + \ldots + \frac{NF_N \times h \times v \times Bo}{Pin_N} \quad (4)$$

Based on Equation (4), an $OSNR_{Xpola}$ of the X-polarized component can be expressed by Equation (5). Based on Equation (4), an $OSNR_{Ypola}$ of the Y-polarized component can be expressed by Equation (6). In Equations (5) and (6), $NF_1$ to $NF_N$ are respective noise figures NF of the N optical amplifiers 211. $Pin_1$ to $Pin_N$ are intensities Pin of signal lights input to the N optical amplifiers 211.

$$\frac{1}{OSNR_{Xpola}} = \frac{NF_1 \times h \times v \times Bo}{Pin_{1-Xpola}} + \frac{NF_2 \times h \times v \times Bo}{Pin_{2-Xpola}} + \ldots + \frac{NF_N \times h \times v \times Bo}{Pin_{N-Xpola}} \quad (5)$$

$$\frac{1}{OSNR_{Ypola}} = \frac{NF_1 \times h \times v \times Bo}{Pin_{1-Ypola}} + \frac{NF_2 \times h \times v \times Bo}{Pin_{2-Ypola}} + \ldots + \frac{NF_N \times h \times v \times Bo}{Pin_{N-Ypola}} \quad (6)$$

It is assumed that a loss during optical fiber transmission is independent of polarization. In this case, with regard to the intensities ($Pin_{1-Xpola}$, $Pin_{1-Ypola}$) of the X-polarized wave and the Y-polarized wave input to the optical amplifier 211, the output of the optical amplifier 211 acts on the optical input intensities ($Pin_2$) of the optical amplifier 211 downstream and then also respectively acts on the optical amplifiers 211 downstream.

For example, if the intensity of the Y-polarized wave is smaller than the intensity of the X-polarized wave of the optical amplifier 211, the OSNR is more deteriorated in the Y-polarized wave than the X-polarized wave as a result of the effect on the input to the optical amplifier 211 downstream. In other words, if a loss during optical fiber transmission is independent of polarization, when a difference in intensity between the X-polarized wave and the X-polarized wave of the optical transmitting device 110 is minimized, the difference in OSsNR between the X-polarized wave and the X-polarized wave is minimized and the deterioration can be minimized in overall OSNR of the polarization multiplexed signal.

However, actual loss during optical fiber transmission is dependent on polarization as indicated by the PDL element 241 in FIG. 2. In an optical transmission path such as a single mode fiber (SMF) between the multiple optical amplifiers 211, a polarization state is not retained and is changed by a change in shape, etc. Therefore, polarization dependent loss occurs due to transmission through the PDL element 241. Therefore, the ratio of intensities of the X-polarized wave and the Y-polarized wave input to a given optical amplifier 211 does not necessarily match the ratio of intensities of the X-polarized wave and the Y-polarized wave input to the optical amplifier 211 downstream.

Although a phenomenon in only one given span is described, in the case of long distance transmission using multiple relays of the optical amplifiers 211 increasing the deterioration in OSNR, PDL occur in multiple spans. In this case, loss due to the PDL for the X-polarized wave and loss due to the PDL for the Y-polarized wave in the polarization multiplexed signal light output from the optical transmitting device 110 randomly occur within a range limited by a sum of the PDL elements 241 in each span.

Because of a phenomenon of a polarization state changing before and after a given time has elapsed, loss in the intensity of the X-polarized wave and loss in the intensity of the Y-polarized wave may change. Therefore, as expressed by the equations, the OSNR of the X-polarized wave and the Y-polarized wave may be changed over time.

The optical transceiving apparatus 100 provides feedback control for detecting an optical input intensity of each polarized wave in the optical receiving device 130 after transmission and transmitting a detection result to the optical transmitting device 110 to manipulate the optical input intensity of each polarized wave in the optical transmitting device 110. As a result, the overall OSNR of the polarization multiplexed signal light can be compensated under the situation where the OSNR is changed in each of the polarized waves over time.

The target of feedback control and the operation of the intensity ratio control unit 118 for the feedback control will be described.

As described, a multi-relay optical transceiving apparatus is configured such that after signal light input to the optical amplifier 211 at a first stage is multiplied by G and ASE optical noise is added thereto, the signal light is input via the PDL element 241 to the optical amplifier 211 downstream over multiple spans one after another.

For example, the optical transceiving apparatus 100 provides control such that the intensities $Pin_{1-Xpola}$, $Pin_{2-Xpola}$, ..., $Pin_{n-Xpola}$ of X-polarized waves and the intensities $Pin_{1-Ypola}$, $Pin_{2-Ypola}$, ..., $Pin_{n-Ypola}$ of Y-polarized waves input to the respective optical amplifiers 211 are averaged and balanced over all the transmission spans. As a result, it can be expected that a difference in OSNR is reduced between the polarized waves.

For example, even if Pin is smaller and the OSNR is more deteriorated in the X-polarized wave than the Y-polarized wave in a given optical amplifier 211, this relationship may be inverted due to PDL, etc. in another optical amplifier 211. Under the condition that the PDL elements 241 are sparsely present at multiple locations with up to about 0.5 [dB] and randomly generated during multi-span transmission, it is hardly conceivable that one of the polarized signals always has greater loss due to PDL. However, since the transmission span is limited as known by, for example, an OSNR limit, even if loss randomly occurs in the intensities of the X-polarized wave and the Y-polarized wave, the intensity loss amounts of the X- and Y-polarized waves due to PDL do not become equal.

In consideration of these situations, when a ratio of the intensity of the X-polarized wave and the intensity of the Y-polarized wave is controlled to be inverted before and after transmission, it can be expected that the difference is reduced between respective OSNRs of the X-polarized wave and the Y-polarized wave. The effect expected of the optical transceiving apparatus 100 varies according to the amount of PDL of lines to which the optical transceiving apparatus 100 is actually applied. The effect is embodied for each case by application to the equations of calculating the OSNRs described above for trial calculations.

FIG. 3 is a diagram of an example of intensity control between polarized waves. The horizontal axis in FIG. 3 indicates a transmission distance of signal light from the optical transmitting device 110 to the optical receiving device 130. TXout on the horizontal axis indicates the position of the optical transmitting device 110. RXin of the horizontal axis indicates the position of the optical receiving device 130. The vertical axis in FIG. 3 indicates optical amplitude [ratio].

Optical amplitude 311 indicates optical amplitude (intensity) of the X-polarized component included in signal light transmitted from the optical transmitting device 110. Optical amplitude 312 indicates optical amplitude of the Y-polarized component included in the signal light transmitted from the optical transmitting device 110. Optical amplitude 321 indicates optical amplitude of the X-polarized component included in signal light received by the optical receiving device 130. Optical amplitude 322 indicates optical amplitude of the Y-polarized component included in the signal light received by the optical receiving device 130.

As indicated by the optical amplitudes 311, 312, 321, and 322, when the ratio of the intensity of the X-polarized wave and the intensity of the Y-polarized wave is controlled to be inverted before and after transmission, the difference between respective OSNRs of the X-polarized wave and the Y-polarized wave can be reduced.

By preventing a concentration of intensity onto one of the polarized waves, deterioration in signal quality due to a nonlinear phenomenon in the optical fiber transmission path can be reduced. For example, in a wavelength division multiplexing (WDM) optical transceiving apparatus, signal quality deterioration in an adjacent channel due to XPM can be suppressed.

The optical amplitudes 311 and 321 can be normalized and expressed as $Psig\_x/(Psig\_x+Psig\_y)$, for example. The optical amplitudes 312 and 322 can be normalized and expressed as $Psig\_y/(Psig\_x+Psig\_y)$, for example. It is preferable to calculate normalized intensities on the assumption that the intensities are different between the transmission side and the reception side, that the detection timings of the intensities are not the same, and that the intensities on the transmission side and the reception side are detected in a time division manner while intensities not associated with PDL fluctuate over time.

The ratio of the intensity of the X-polarized component to the intensity of the Y-polarized component in the signal light transmitted from the optical transmitting device 110 is denoted by TXratio=$Psig\_x/Psig\_y$. The ratio of the intensity of the X-polarized component to the intensity of the Y-polarized component in the signal light received by the optical receiving device 130 is denoted by RXratio. In this case, the feedback control target is TXratio=1/RXratio.

If TXratio×RXratio>1, the intensity ratio control unit 118 provides control to reduce the ratio of the intensity of the X-polarized wave to the intensity of the Y-polarized wave. For example, the intensity ratio control unit 118 increases the amount of attenuation of the intensity adjusting element 115x corresponding to the X-polarized wave. Alternatively, the intensity ratio control unit 118 may decrease the amount of attenuation of the intensity adjusting element 115y corresponding to the Y-polarized wave. The intensity ratio control unit 118 may both increase the amount of attenuation of the intensity adjusting element 115x and decrease the amount of attenuation of the intensity adjusting element 115y.

If TXratio×RXratio=1, the intensity ratio control unit 118 maintains the ratio of the intensity of the X-polarized wave to the intensity of the Y-polarized wave. For example, the intensity ratio control unit 118 maintains the amount of attenuation of intensity adjusting elements 115x and 115y.

If TXratio×RXratio<1, the intensity ratio control unit 118 provides control to increase the ratio of the intensity of the X-polarized wave to the intensity of the Y-polarized wave. For example, the intensity ratio control unit 118 increases the amount of attenuation of the intensity adjusting element 115y corresponding to the Y-polarized wave. Alternatively, the intensity ratio control unit 118 may decrease the amount of attenuation of the intensity adjusting element 115x corresponding to the X-polarized wave. The intensity ratio control unit 118 may both increase the amount of attenuation of the intensity adjusting element 115y and decrease the amount of attenuation of the intensity adjusting element 115x.

For example, it is assumed that the ratio of the intensities [w] of the X-polarized wave and the Y-polarized wave in the signal light transmitted from the optical transmitting device 110 is 0.40:0.60 and that the ratio of the intensities [w] of the X-polarized wave and the Y-polarized wave in the signal light received by the optical receiving device 130 is 0.45: 0.55. In this case, because of TXratio×RXratio=0.40/0.60× 0.45/0.55=0.545 . . . <1, the intensity ratio control unit 118 increases the ratio of the intensity of the X-polarized wave to the intensity of the Y-polarized wave.

If this causes an increase in the intensity of the X-polarized wave at a rate of 0.1 in the next state, TXratio×RXratio is (0.40+0.01)/(0.60−0.01)×(0.45+0.01)/(0.55−0.01)=0.592, which is closer to 1 and still smaller than 1. Therefore, the intensity ratio control unit 118 provides control again to increase the ratio of the intensity of the X-polarized wave to the intensity of the Y-polarized wave.

The convergence point of feedback control in this case is TXratio×RXratio=1. For example, when the rate of change in the intensity due to the intensity manipulation of the X-polarized wave of the optical transmitting device 110 is X, (0.4+X)/(0.6−X)×(0.45+X)/(0.55−X)=1 is acquired and therefore, an adjustment to X=0.0714 is performed.

For example, when an intensity manipulation amount of the X-polarized wave of the optical transmitting device 110 is X, Equation (7) is satisfied. In Equation (7), TXout_Psig_x_pola is the intensity of the X-polarized wave in the signal light transmitted from the optical transmitting device 110. TXout_Psig_y_pola is the intensity of the Y-polarized wave in the signal light transmitted from the optical transmitting device 110. RXin_Psig_x_pola is the intensity of the X-polarized wave in the signal light received by the optical receiving device 130. RXin_Psig_y_pola is the intensity of the Y-polarized wave in the signal light received by the optical receiving device 130.

$$\frac{(\text{TXout\_Psig\_x\_pola}) + X}{(\text{TXout\_Psig\_y\_pola}) - X} \times \frac{(\text{RXin\_Psig\_x\_pola}) + X}{(\text{RXin\_Psig\_y\_pola}) - X} = 1 \quad (7)$$

Solving Equation (7) for X, Equation (8) is acquired.

$$X = \frac{(\text{TXout\_Psig\_y\_pola}) \times (\text{RXin\_Psig\_y\_pola}) - (\text{TXout\_Psig\_x\_pola}) \times (\text{Rin\_Psig\_x\_pola})}{(\text{TXout\_Psig\_x\_pola}) + (\text{TXout\_Psig\_y\_pola}) + (\text{RXin\_Psig\_x\_pola}) + (\text{RXin\_Psig\_y\_pola})} \quad (8)$$

The equation of the feedback control is not limited to Equation (8) and conversion may be used in consideration of properties of a processor, for example.

Although an intensity ratio of the polarized components included in the signal light transmitted from the optical transmitting device 110 is controlled such that a constant value is acquired as the product of the intensity ratio and an intensity ratio of the polarized components included in the signal light received by the optical receiving device 130 in the configuration described, configuration is not limited hereto. In other words, at least the magnitude relation of intensity of the polarized components included in the signal light transmitted from the optical transmitting device 110 may be controlled to be opposite to the magnitude relation of intensity of the polarized components included in the signal light received by the optical receiving device 130. As a result, a difference in OSNR between the polarized waves can be reduced and therefore, the transmission characteristics can be improved.

For example, the intensity acquiring unit 133 of the optical receiving device 130 may acquire the reception intensity ratio information indicative of the magnitude relation as a difference in intensity (e.g., Vx−Vy) of the polarized components included in the signal light received by the optical receiving device 130. The intensity ratio control unit 118 of the optical transmitting device 110 controls a difference in intensity between the polarized components included in the signal light sent out from the optical transmitting device 110 such that a constant value (e.g., 0) is acquired as a sum of the difference and a difference indicated by the reception intensity ratio information from the optical receiving device 130. As a result, a difference in OSNR between the polarized waves can be reduced and therefore, the transmission characteristics can be improved.

The intensity acquiring unit 133 may acquire reception intensity magnitude information indicative of the magnitude relation of intensity (e.g., Vx>Vy or Vx<Vy) of the polarized components included in the signal light received by the optical receiving device 130. The transmitting unit 134 transmits the reception intensity magnitude information to the optical transmitting device 110. If the reception intensity magnitude information indicates Vx>Vy, the intensity ratio control unit 118 provides control such that the intensity of the X-polarized component included in the signal light sent out from the optical transmitting device 110 becomes smaller than the intensity of the Y-polarized component included in the signal light sent out from the optical transmitting device 110.

If the reception intensity magnitude information indicates Vx<Vy, the intensity ratio control unit 118 provides control such that the intensity of the X-polarized component included in the signal light sent out from the optical transmitting device 110 becomes larger than the intensity of the Y-polarized component included in the signal light sent out from the optical transmitting device 110. As a result, a difference in OSNR between the polarized waves can be reduced and therefore, the transmission characteristics can be improved.

In the configuration described hereinafter, an intensity ratio of the polarized components included in the signal light transmitted from the optical transmitting device 110 is controlled such that a constant value is acquired as the product of the intensity ratio and an intensity ratio of the polarized components included in the signal light received by the optical receiving device 130

FIG. 4A is a diagram of a first example of configuration of the optical transmitting device according to the embodiment. In FIG. 4A, components identical to the components depicted in FIG. 1 are denoted by the same reference numerals used in FIG. 1 and will not be described. For example, if the modulators 114x and 114y are Mach-Zehnder interferometers, the intensity adjusting elements 115x and 115y depicted in FIG. 1 can be implemented by the driving units 113x and 113y and the modulators 114x and 114y of the optical transmitting device 110.

In this case, as depicted in FIG. 4A, the intensity ratio control unit 118 controls drive voltages output by the driving units 113x and 113y to the modulators 114x and 114y, respectively, to adjust the amplitudes of the signal light emitted from the modulators 114x and 114y.

FIG. 4B is a diagram of a modification of the optical transmitting device depicted in FIG. 4A. In FIG. 4B, components identical to the components depicted in FIG. 1 are denoted by the same reference numerals used in FIG. 1 and will not be described. The intensity adjusting elements 115x and 115y depicted in FIG. 1 can be implemented by optical attenuators (ATT) 421 and 422 depicted in FIG. 4B, for example.

For example, the attenuators 421 and 422 can be implemented by optical elements for which transmissivity is varied by changing the applied voltage or by elements capable of varying the optical coupling rate by changing the direction of an optical path.

In this case, as depicted in FIG. 4B, the intensity ratio control unit 118 controls the amount of attenuation in the attenuators 421 and 422 to adjust the amplitudes of the signal lights emitted from the attenuators 421 and 422.

FIG. 5A is a second example of configuration of the optical transmitting device according to the embodiment. In FIG. 5A, components identical to the components depicted in FIG. 1 are denoted by the same reference numerals used in FIG. 1 and will not be described. As depicted in FIG. 5A, the optical transmitting device 110 may further include oscillators 511, 512 and superimposing units 521, 522.

The oscillators 511, 512 and the superimposing units 521, 522 form a superimposing unit that superimposes a signal component having a frequency different from the X-polarized signal light and the Y-polarized signal light onto at least one among the X-polarized signal light and the Y-polarized signal light included in the signal light sent out from the optical transmitting device 110.

The oscillator 511 oscillates a low frequency signal at a frequency fx and outputs the oscillated low frequency signal to the superimposing unit 521. The oscillator 512 oscillates a low frequency signal at a frequency fy different from the frequency fx and outputs the oscillated low frequency signal to the superimposing unit 522. The frequencies fx and fy are frequencies different from data output from the data units 112x and 112y. The frequencies fx and fy will be described later.

The superimposing unit 521 superimposes (e.g., adds) the low frequency signal of the frequency fx output from the oscillator 511 onto the drive voltage output from the drive unit 113x. The superimposing unit 521 outputs to the modulator 114x, the drive signal onto which the low frequency signal has been superimposed. As a result, the component of the frequency fx can be superimposed onto the signal light for X-polarization emitted from the modulator 114x.

The superimposing unit 522 superimposes (e.g., adds) the low frequency signal of the frequency fy output from the oscillator 512 onto the drive voltage output from the drive unit 113y. The superimposing unit 522 outputs to the modulator 114y, the drive signal onto which the low frequency signal has been superimposed. As a result, the component of the frequency fy can be superimposed onto the signal light for Y-polarization emitted from the modulator 114y.

FIG. 5B is a diagram of a modification of the optical transmitting device depicted in FIG. 5A. In FIG. 5B, components identical to the components depicted in FIG. 5A are denoted by the same reference numerals used in FIG. 5A and will not be described. The optical transmitting device 110 may be configured to superimpose the component of the frequency fx onto the signal light for X-polarization without superimposing the component of the frequency fy onto the signal light for Y-polarization. In this case, as depicted in FIG. 5B, the oscillator 512 and the super imposing unit 522 depicted in FIG. 5A may be eliminated.

FIG. 6 is a diagram of an example of signal light onto which a low frequency signal has been superimposed. The horizontal axis in FIG. 6 indicates time. The vertical axis in FIG. 6 indicates optical amplitude. Signal light 610 represents the signal light emitted from the modulator 114x depicted in FIG. 5A, for example. A period dt indicates a fluctuation period of the signal light 610. A frequency 1/dt is the frequency fx of the low frequency signal superimposed onto the signal light 610. Amplitude 611 indicates the modulation amplitude of the signal light 610.

If the modulator 114x is a Mach-Zehnder interferometer, intensity modulation of the signal light for X-polarization emitted from the modulator 114x can be performed with the frequency fx by superimposing the low frequency signal of the frequency fx onto the drive voltage input to the modulator 114x.

Although the signal light for X-polarization is described, intensity modulation of the signal light for Y-polarization emitted from the modulator 114y can be performed with the frequency fy by superimposing the low frequency signal of the frequency fy onto the drive voltage input to the modulator 114y for the signal light for Y-polarization.

The low frequency signals of the frequencies fx and fy are respectively superimposed onto the drive signals input to the modulators 114x and 114y in the configuration described. On the other hand, components of the frequencies fx and fy may respectively be superimposed onto the X-polarized and Y-polarized signal lights by elements (driving amplitudes of optical attenuators, optical amplifiers, and modulators) capable of varying the intensities of the signal lights such as the intensity adjusting elements 115x and 115y, for example.

Figure 7:
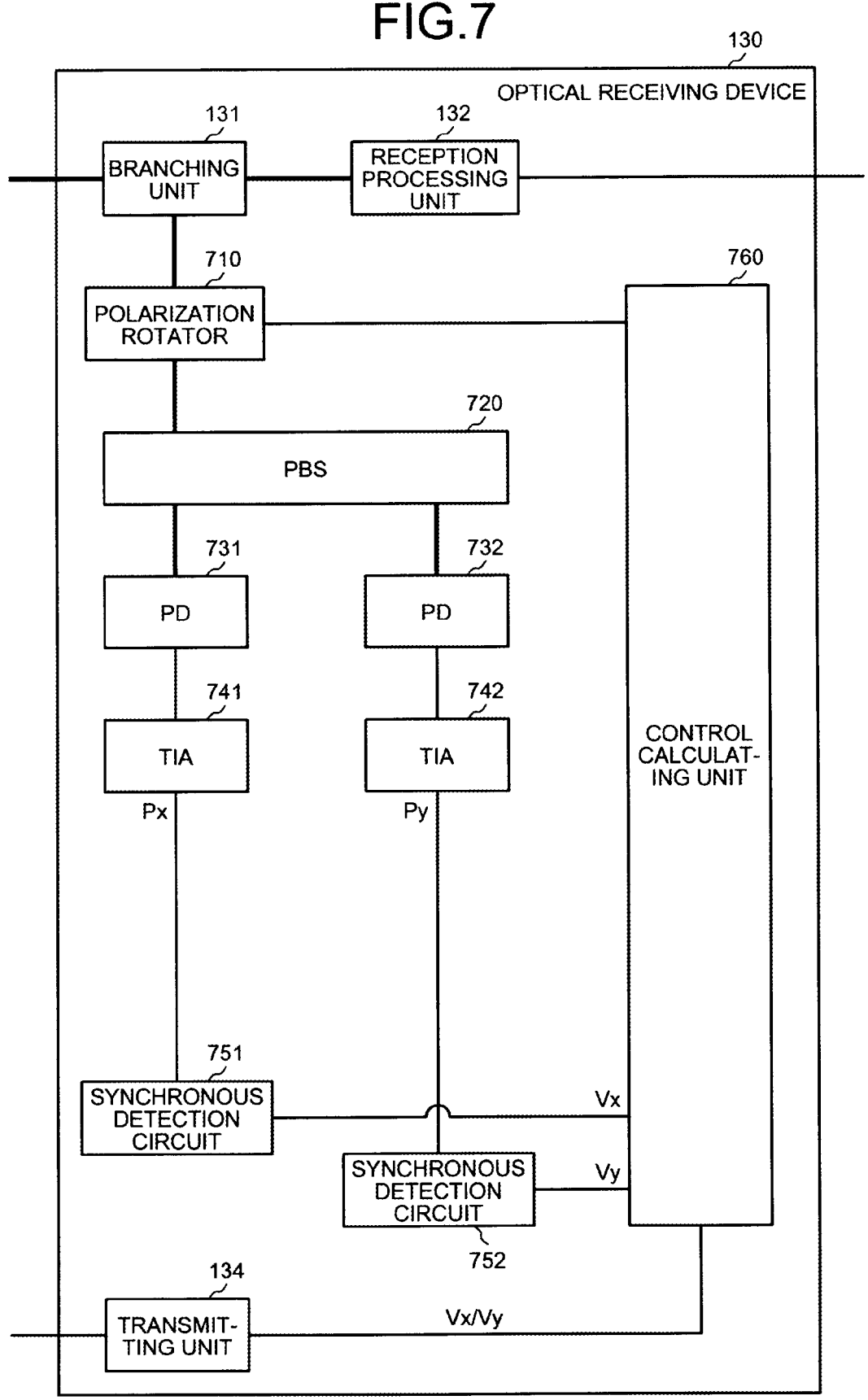
FIG. 7 is a diagram of a first example of configuration of an optical receiving device according to the embodiment.

FIG. 7 is a diagram of a first example of configuration of the optical receiving device according to the embodiment. In FIG. 7, components identical to the components depicted in FIG. 1 are denoted by the same reference numerals used in FIG. 1 and will not be described. The optical receiving device 130 depicted in FIG. 7 has a configuration corresponding to the optical transmitting device 110 depicted in FIG. 5A (superimposing the low frequency signals of the frequencies fx and fy).

As depicted in FIG. 7, the intensity acquiring unit 133 depicted in FIG. 1 can be implemented by a polarization rotator 710, a PBS 720, PDs 731, 732, TIAs 741, 742, synchronous detection circuits 751, 752, and a control calculating unit 760.

The polarization rotator 710, under the control of the control calculating unit 760, rotates the polarization direction of signal light emitted from the branching unit 131. The polarization rotator 710 outputs to the PBS 720, signal light having a rotated polarization direction.

The polarization beam splitter (PBS) 720 demultiplexes the signal light from the polarization rotator 710 into an X-polarized wave and a Y-polarized wave. The PBS 720 outputs the demultiplexed X-polarized signal light to the PD 731. The PBS 720 outputs the demultiplexed Y-polarized signal light to the PD 732.

The photodetector (PD) 731 converts the X-polarized signal light from the PBS 720 into an electrical signal. The PD 731 outputs the converted signal to the TIA 741. The PD 732 converts the Y-polarized signal light from the PBS 720 into an electrical signal. The PD 732 outputs the converted signal to the TIA 742.

The transimpedance amplifier (TIA) 741 linearly amplifies the signal output from the PD 731. The TIA 741 outputs a linearly amplified signal Px to the synchronous detection circuit 751. The TIA 742 linearly amplifies the signal output from the PD 732. The TIA 742 outputs a linearly amplified signal Py to the synchronous detection circuit 752.

The synchronous detection circuit 751, via synchronous detection, extracts a signal component of the frequency fx included in the signal Px output from the TIA 741 and outputs the extracted signal component as a signal Vx to the control calculating unit 760. The synchronous detection circuit 752, via synchronous detection, extracts a signal component of the frequency fy included in the signal Py output from the TIA 742 and outputs the extracted signal component as a signal Vy to the control calculating unit 760.

The control calculating unit 760 controls the polarization rotation amount in the polarization rotator 710 and calculates an intensity ratio of the X-polarized wave and the Y-polarized wave included in the signal received by the optical receiving device 130 based on the signals Vx and Vy output from the synchronous detection circuits 751 and 752. The operation of the control calculating unit 760 will be described later.

Figure 8A:
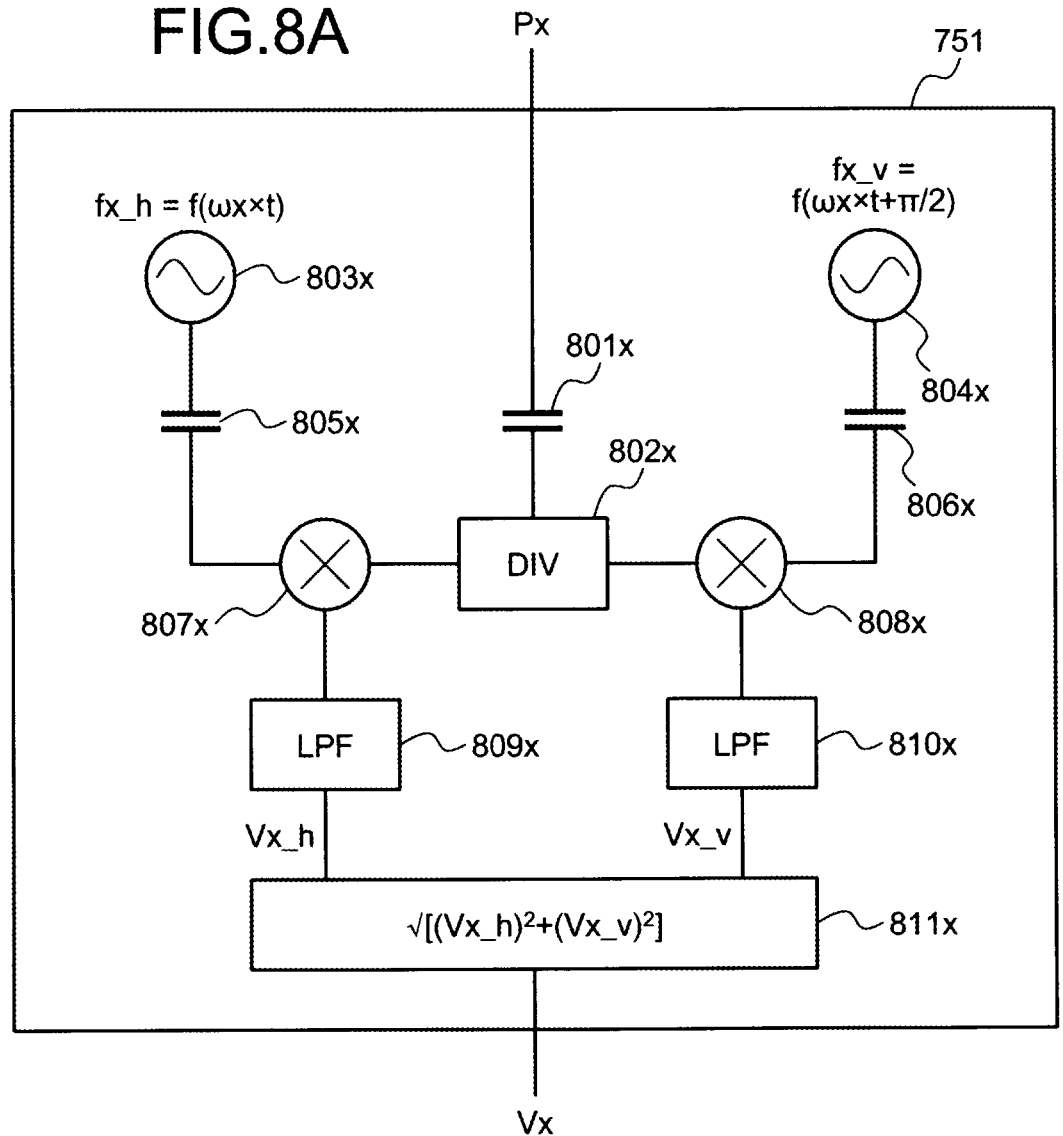
FIG. 8A is a diagram of an example of a configuration of a synchronous detection circuit (X-polarization) depicted in FIG. 7.

FIG. 8A is a diagram of an example of a configuration of the synchronous detection circuit (X-polarization) depicted in FIG. 7. As depicted in FIG. 8A, the synchronous detection circuit 751 depicted in FIG. 7 includes capacitors 801x, 805x, 806x, a branching unit 802x, oscillators 803x, 804x, multiplying units 807x, 808x, LPFs 809x, 810x, and a calculating unit 811x.

The signal Px output from the TIA 741 (see FIG. 7) is input via the capacitor 801x to the branching unit 802x. The branching unit 802x (DIV) branches the input signal Px and outputs the branches of the signal Px to the multiplying units 807x and 808x.

The oscillator 803x oscillates a low frequency signal fx_h=f($\omega$x×t) of the frequency fx. The oscillator 803x outputs to the multiplying unit 807x, the oscillated low frequency signal fx_h via the capacitor 805x. The oscillator 804x oscillates a low frequency signal fx_v=f($\omega$x×t+$\pi$/2) of the frequency fx. The low frequency signal fx_v is a low frequency signal having a phase shifted by 90 degrees from the low frequency signal fx_h. The oscillator 804x outputs the oscillated low frequency signal fx_v via the capacitor 806x to the multiplying unit 808x.

The multiplying unit 807x multiplies the signal Px output from the branching unit 802x by the low frequency signal fx_h output from the oscillator 803x. The multiplying unit 807x outputs the resulting signal to the LPF 809x. The multiplying unit 808x multiplies the signal Px output from the branching unit 802x by the low frequency signal fx_v output from the oscillator 804x. The multiplying unit 808x outputs the resulting signal to the LPF 810x.

The low pass filter (LPF) 809x extracts a low frequency component of the signal output from the multiplying unit 807x to extract the signal vx_h of the frequency x. The LPF 809x outputs the extracted signal vx_h to the calculating unit 811x. The LPF 810x extracts a low frequency component of the signal output from the multiplying unit 808x to extract the signal vx_v of the frequency x. The LPF 810x outputs the extracted signal vx_v to the calculating unit 811x.

The calculating unit 811x calculates $\sqrt{(vx\_h)^2+(Vx\_v)^2}$ based on the signal Vx_h output from the LPF 809x and the signal Vx_v output from the LPF 810x, thereby enabling the calculation of the signal Vx indicative of the amount of the X-polarized component of the signal input to the PD 731 (see FIG. 7). The calculating unit 811x outputs the calculated signal Vx to the control calculating unit 760 (see FIG. 7).

FIG. 8B is a diagram of an example of a configuration of the synchronous detection circuit (Y-polarization) depicted in FIG. 7. As depicted in FIG. 8B, the synchronous detection circuit 752 depicted in FIG. 7 includes capacitors 801y, 805y, 806y, a branching unit 802y, oscillators 803y, 804y, multiplying units 807y, 808y, LPFs 809y, 810y, and a calculating unit 811y.

The signal Py output from the TIA 742 (see FIG. 7) is input via the capacitor 801y to the branching unit 802y. The branching unit 802y (DIV) branches the input signal Py and outputs the branches of the signal Py to the multiplying units 807y and 808y.

The oscillator 803y oscillates a low frequency signal fy_h=f($\omega$y×t) of the frequency fy. The oscillator 803y outputs to the multiplying unit 807y, the oscillated low frequency signal fy_h via the capacitor 805y. The oscillator 804y oscillates a low frequency signal fy_v=f($\omega$y×t+$\pi$/2) of the frequency fy. The low frequency signal fy_v is a low frequency signal having a phase shifted by 90 degrees from the low frequency signal fy_h. The oscillator 804y outputs to the multiplying unit 808y, the oscillated low frequency signal fy_v via the capacitor 806y.

The multiplying unit 807y multiplies the signal Py output from the branching unit 802y by the low frequency signal fy_h output from the oscillator 803y. The multiplying unit 807y outputs the resulting signal to the LPF 809y. The multiplying unit 808y multiplies the signal Py output from the branching unit 802y by the low frequency signal fy_v output from the oscillator 804y. The multiplying unit 808y outputs the resulting signal to the LPF 810y.

The LPF 809y extracts a low frequency component of the signal from the multiplying unit 807y to extract the signal vy_h of the frequency y. The LPF 809y outputs the extracted signal vy_h to the calculating unit 811y. The LPF 810y extracts a low frequency component of the signal from the multiplying unit 808y to extract the signal vy_v of the frequency y. The LPF 810y outputs the extracted signal vy_v to the calculating unit 811y.

The calculating unit 811y calculates $\sqrt{(vy\_h)^2+(Vy\_v)^2}$ based on the signal Vy_h output from the LPF 809y and the signal Vy_v output from the LPF 810y, thereby enabling the calculation of the signal Vy indicative of the amount of the Y-polarized component of the signal input to the PD 732 (see FIG. 7). The calculating unit 811y outputs the calculated signal Vy to the control calculating unit 760 (see FIG. 7).

FIG. 9 is a flowchart of an operation example of the control calculating unit depicted in FIG. 7. The control calculating unit 760 depicted in FIG. 7 executes steps depicted in FIG. 9, for example. First, the control calculating unit 760 stores the signals Vx and Vy output from the synchronous detection circuits 751 and 752 as signals vx1 and Vy1 (step S901).

The control calculating unit 760 changes the polarization rotation amount of the polarization rotator 710 in the forward direction by a constant amount (e.g., 5 [deg]) (step S902). The control calculating unit 760 stores the signals Vx and Vy output from the synchronous detection circuits 751 and 752 as signals vx2 and Vy2 (step S903).

The control calculating unit 760 determines whether Vx1>Vx2 and Vy1>Vy2 are satisfied based on the signals stored at steps S901 and S903 (step S904). If Vx1>Vx2 and Vy1>Vy2 are not satisfied (step S904: NO), the control calculating unit 760 changes the polarization rotation amount of the polarization rotator 710 in the forward direction by a constant amount until the signals Vx and Vy are maximized (step S905) and goes to step S907. If Vx1>Vx2 and Vy1>Vy2 are satisfied (step S904: YES), the control calculating unit 760 changes the polarization rotation amount of the polarization rotator 710 in the backward direction by a constant amount until the signals Vx and Vy are maximized (step S906) and goes to step S907.

At step S907, the control calculating unit 760 outputs, as the reception intensity ratio information, a ratio Vx/vy based on the signals Vx and Vy output from the synchronous detection circuits 751 and 752 at this point (step S907) and terminates the series of operations. The steps described above enable the acquisition of the reception intensity ratio information indicative of the intensity ratio of the X-polarized wave and the Y-polarized wave included in the signal light received by the optical receiving device 130.

Figure 10A:
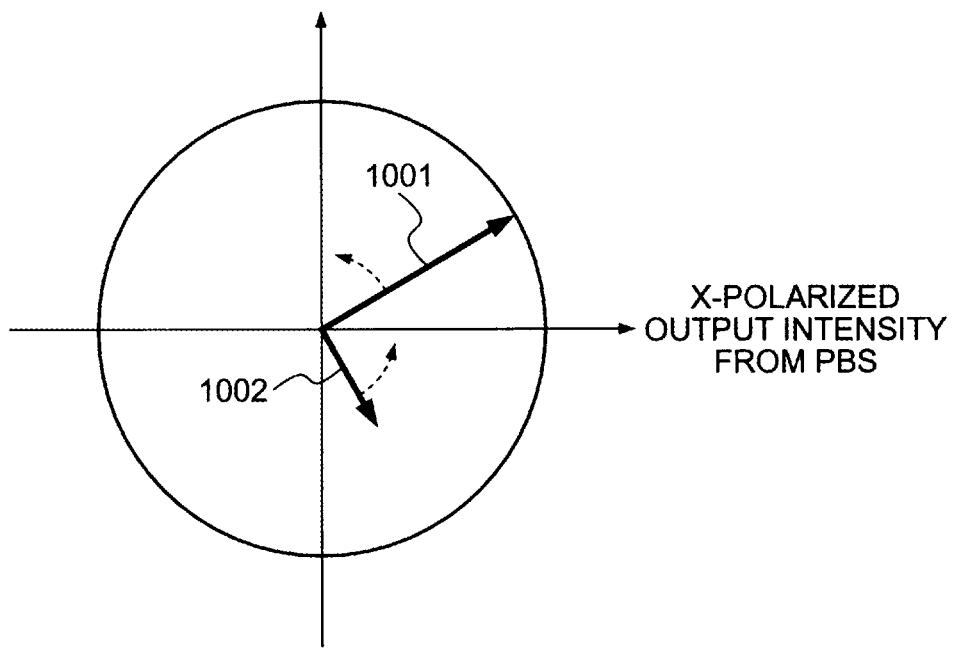
FIG. 10A is a diagram (part 1) of an example of control of a polarization rotator.
Figure 10B:
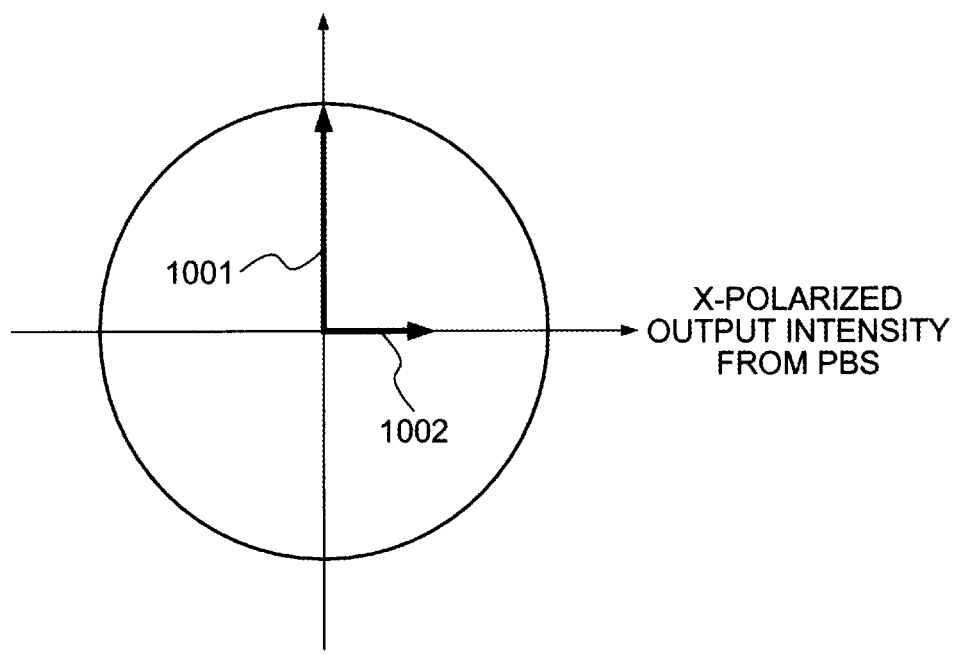
FIG. 10B is a diagram (part 2) of an example of the control of the polarization rotator.

FIG. 10A is a diagram (part 1) of an example of the control of the polarization rotator. FIG. 10B is a diagram (part 2) of an example of the control of the polarization rotator. The horizontal axes in FIGS. 10A and 10B indicate the signal intensity (output intensity) of the X-polarized wave output from the PBS 720 depicted in FIG. 7. The vertical axes in FIGS. 10A and 10B indicate the signal intensity (output intensity) of the Y-polarized wave output from the PBS 720 depicted in FIG. 7.

An optical electric-field vector 1001 indicates the Y-polarized signal component included in the signal light output from the polarization rotator 710. An optical electric-field vector 1002 indicates the X-polarized signal component included in the signal light output from the polarization rotator 710.

It is assumed that the signal light transmitted from the optical transmitting device 110 has the polarization direction rotated in the optical network 120 as depicted in FIG. 10A. The control calculating unit 760 can control the polarization rotation amount of the polarization rotator 710 to maximize the signals Vx and Vy output from the synchronous detection circuits 751 and 752, thereby achieving the state of FIG. 10B.

In the state of FIG. 10B, the ratio Vx/vy of the signals Vx and Vy output from the synchronous detection circuits 751 and 752 can be calculated to acquire the reception intensity ratio information indicative of the intensity ratio of the X-polarized wave and the Y-polarized wave included in the signal light received by the optical receiving device 130.

To identify which one is the X-polarized (or Y-polarized) signal light, the identification can be made based on a predetermined frequency superimposed by the optical transmitting device, by using a frequency detection circuit (or BPF) to identify whether the frequency component is present. For example, if the optical transmitting device 110 superimposes a component of the frequency fx onto the X-polarized wave, a polarized signal having the frequency fx detected by the optical receiving device 130 can be identified as the X-polarized signal.

Since the identification of either the X-polarized wave or the Y-polarized wave reveals that the other is the Y-polarized wave or the X-polarized wave, a configuration superimposing and detecting a signal for identification onto and from at least one of the polarized signals suffices.

Figure 11:
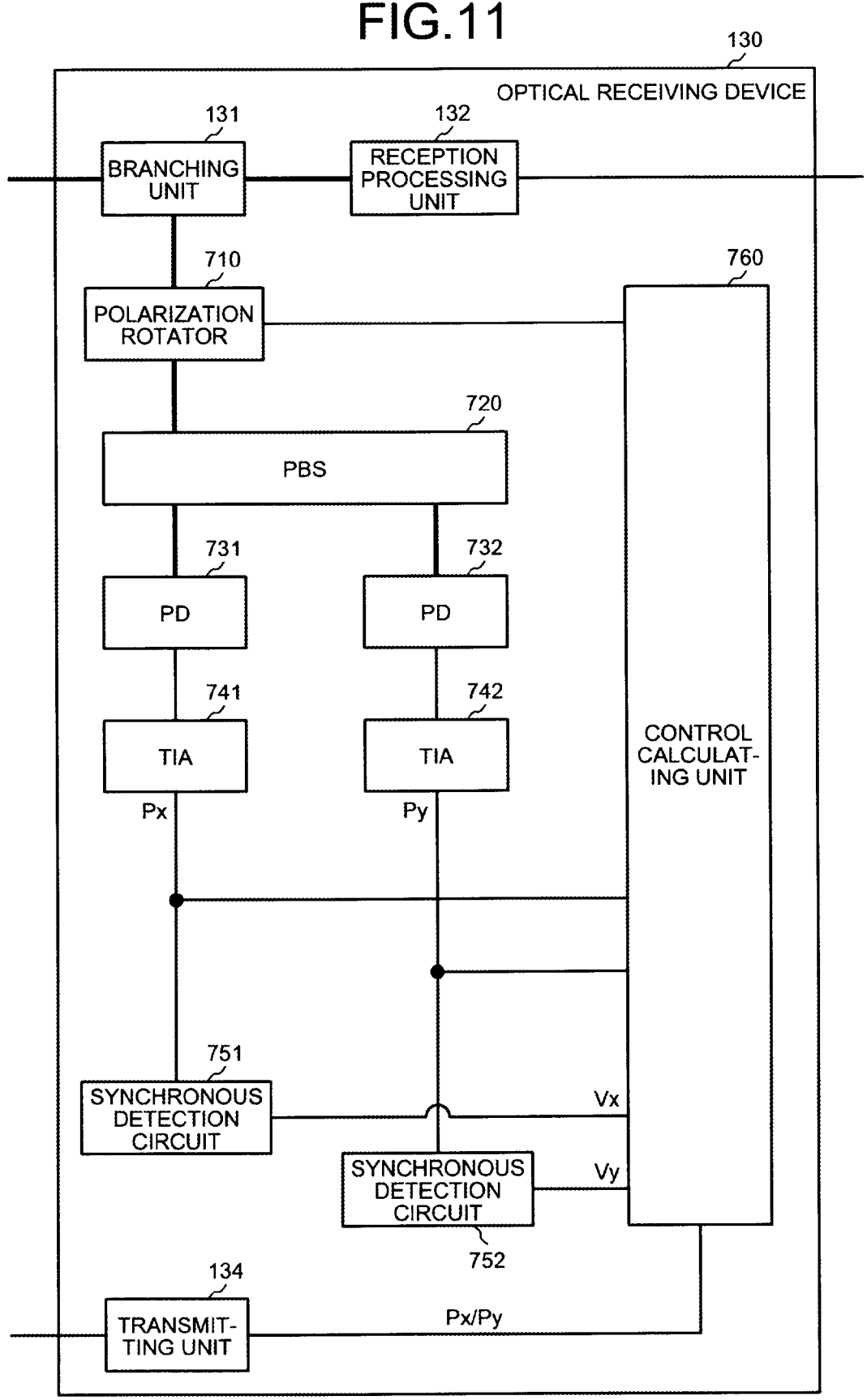
FIG. 11 is a diagram of a modification of the optical receiving device depicted in FIG. 7.

FIG. 11 is a diagram of a modification of the optical receiving device depicted in FIG. 7. In FIG. 11, components identical to the components depicted in FIG. 7 are denoted by the same reference numerals used in FIG. 7 and will not be described. The optical receiving device 130 depicted in FIG. 11 has a configuration corresponding to the optical transmitting device 110 depicted in FIG. 5B. In other words, if a component of the frequency fx is superimposed onto the signal light for X-polarization and a component of the frequency fy is not superimposed onto the signal light for Y-polarization as in the optical transmitting device 110 depicted in FIG. 5B, the optical receiving device 130 can be configured as depicted in FIG. 11.

The TIA 741 depicted in FIG. 11 outputs the converted signal Px to the synchronous detection circuit 751 and the control calculating unit 760. The TIA 742 outputs the converted signal Py to the synchronous detection circuit 752 and the control calculating unit 760.

The control calculating unit 760 controls the polarization rotator 710 and calculates an intensity ratio of the X-polarized wave and the Y-polarized wave based on the signals Px and Py output from the TIAs 741 and 742 and the signals Vx and Vy output from the synchronous detection circuits 751 and 752. Operation of the control calculating unit 760 will be described later.

In this case, the same configuration as the synchronous detection circuit 751 depicted in FIG. 8A is applicable to the synchronous detection circuit 752. As a result, the synchronous detection circuits 751 and 752 can calculate the signal Vx and the signal Vy indicative of amounts of the X-polarized components of the signals input to the PD 731 and 732, respectively.

Figure 12:
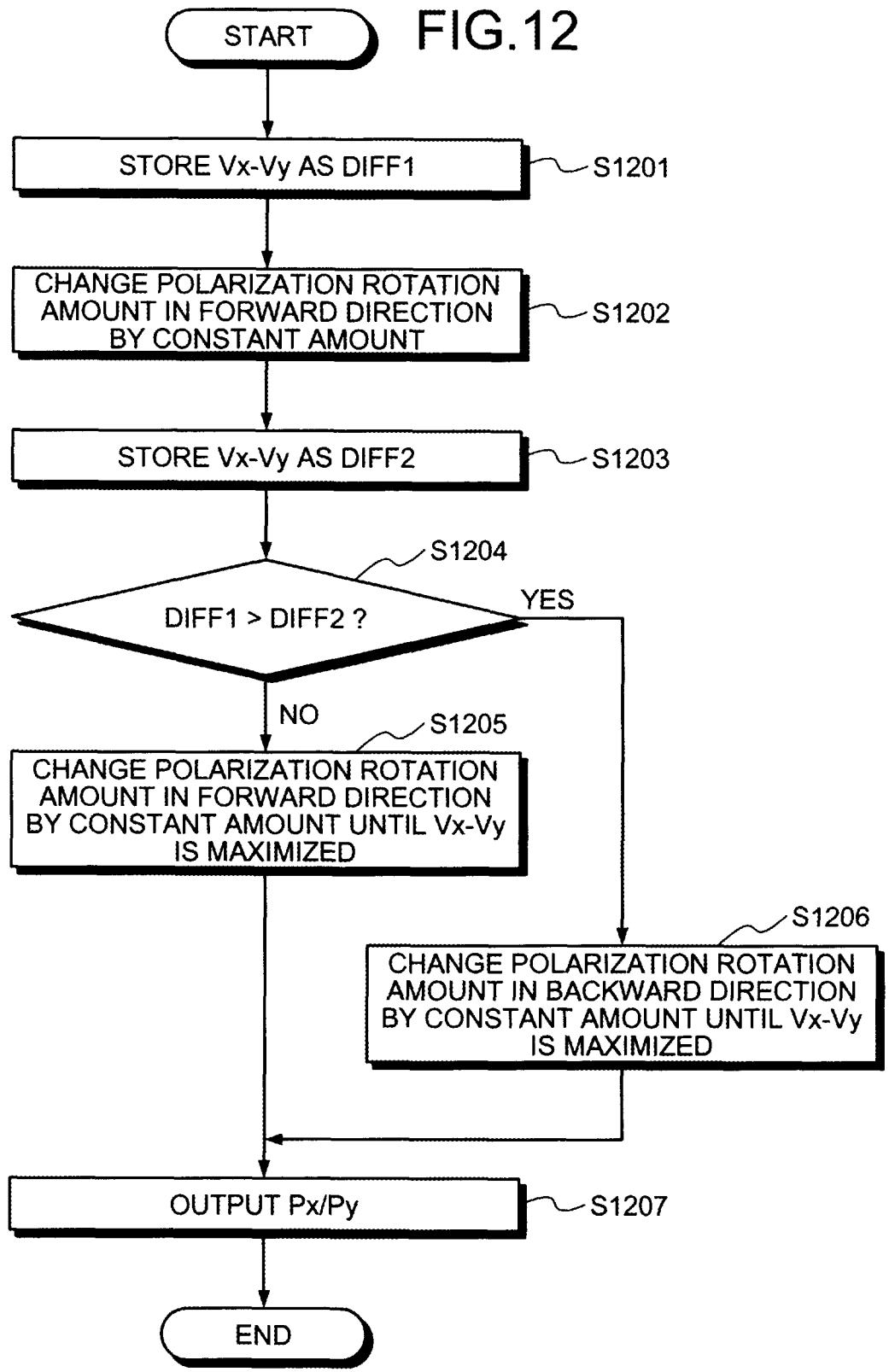
FIG. 12 is a flowchart of an operation example of the control calculating unit depicted in FIG. 11.

FIG. 12 is a flowchart of an operation example of the control calculating unit depicted in FIG. 11. The control calculating unit 760 depicted in FIG. 11 executes steps depicted in FIG. 12, for example. First, the control calculating unit 760 stores a difference Vx-Vy of the signals Vx and Vy output from the synchronous detection circuits 751 and 752 as DIFF1 (step S1201).

The control calculating unit 760 changes the polarization rotation amount of the polarization rotator 710 in the forward direction by a constant amount (e.g., 5 [deg]) (step S1202). The control calculating unit 760 stores a difference Vx-Vy of the signals Vx and Vy output from the synchronous detection circuits 751 and 752 as DIFF2 (step S1203).

The control calculating unit 760 determines whether DIFF1>DIFF2 is satisfied based on DIFF1 and DIFF2 stored at steps S1201 and S1203 (step S1204). If DIFF1>DIFF2 is not satisfied (step S1204: NO), the control calculating unit 760 changes the polarization rotation amount of the polarization rotator 710 in the forward direction by a constant amount until a difference Vx–Vy of the signals Vx and Vy is maximized (step S1205) and goes to step S1207. If DIFF1>DIFF2 is satisfied (step S1204: YES), the control calculating unit 760 changes a polarization rotation amount of the polarization rotator 710 in the backward direction by a constant amount until the difference Vx-Vy of the signals Vx and Vy is maximized (step S1206) and goes to step S1207.

At step S1207, the control calculating unit 760 outputs a ratio Px/Py as the reception intensity ratio information based on the signals Px and Py output from the TIAs 741 and 742 at this point (step S1207) and terminates the series of operations. The steps described above enable the acquisition of the reception intensity ratio information indicative of the intensity ratio of the X-polarized wave and the Y-polarized wave included in the signal light received by the optical receiving device 130.

As described, the optical transmitting device 110 may be configured to superimpose onto at least one of the X-polarized signal light and the Y-polarized signal light, a signal component having a frequency different from the X-polarized signal light and the Y-polarized signal light. The optical receiving device 130 can acquire the reception intensity ratio information (information indicative of magnitude relation) based on the intensity of the signal component superimposed onto the received signal light.

Figure 13:
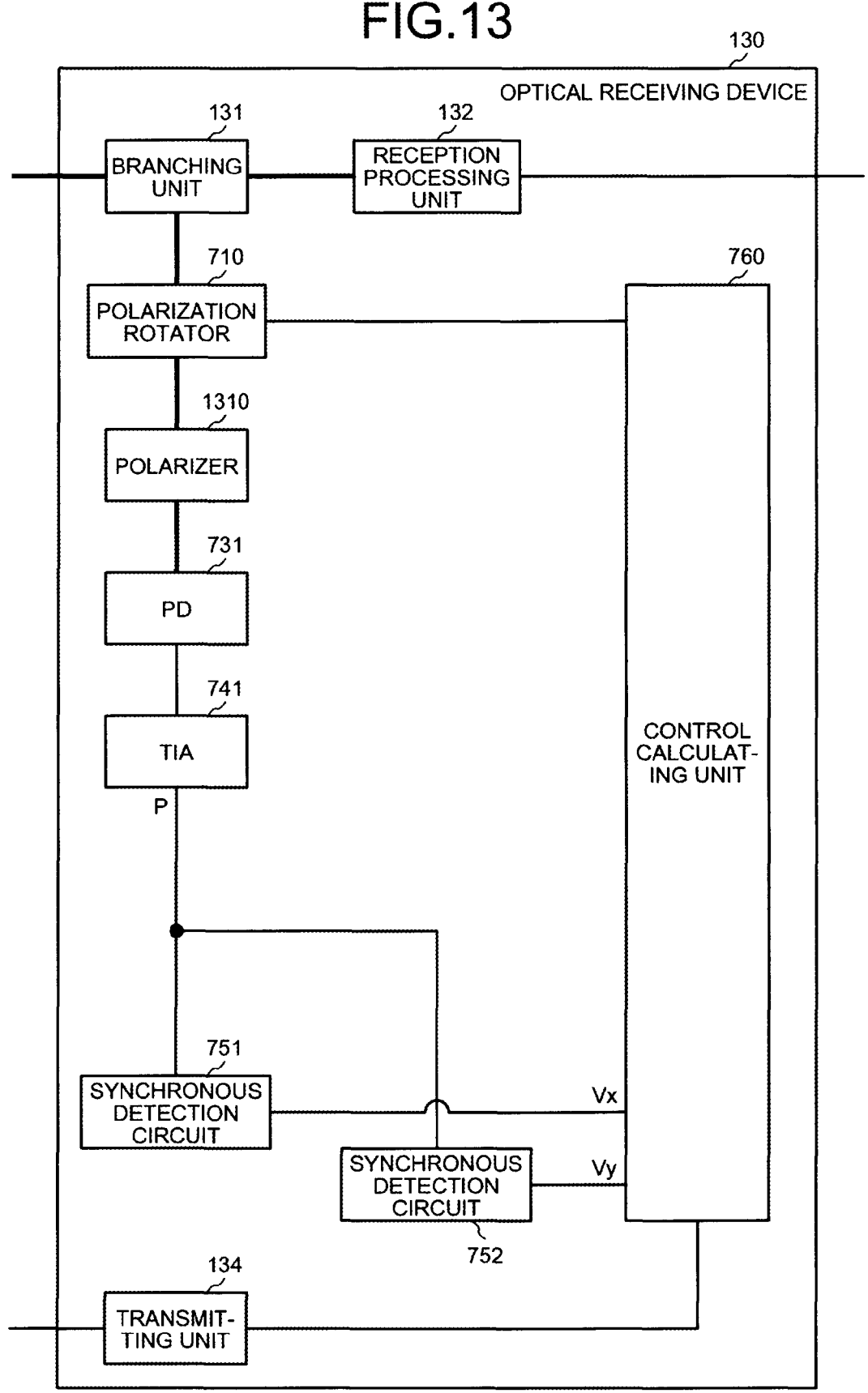
FIG. 13 is a diagram of a second example of configuration of the optical receiving device according to the embodiment.

FIG. 13 is a diagram of a second example of configuration of the optical receiving device according to the embodiment. In FIG. 13, components identical to the components depicted in FIG. 7 are denoted by the same reference numerals used in FIG. 7 and will not be described. As depicted in FIG. 13, the optical receiving device 130 may include a polarizer 1310 instead of the PB 720, the PD 732, and the TIA 742 depicted in FIG. 7.

The polarizer 1310 allows passage of only the X-polarized component of the signal light emitted from the polarization rotator 710 and emits the component to the PD 731. The PD 731 converts the X-polarized signal light emitted from the polarizer 1310 into an electrical signal. The TIA 741 outputs a linearly amplified signal P to the synchronous detection circuits 751 and 752.

The synchronous detection circuit 751 extracts a signal component of the frequency fx included in the signal P output from the TIA 741 through synchronous detection and outputs the extracted signal component as a signal Vx to the control calculating unit 760. The synchronous detection circuit 752, via synchronous detection, extracts a signal component of the frequency fy included in the signal P output from the TIA 741 and outputs the extracted signal component as a signal Vy to the control calculating unit 760.

The control calculating unit 760 controls the polarization rotator 710 and calculates an intensity ratio of the X-polarized wave and the Y-polarized wave based on the signals Vx and Vy output from the synchronous detection circuits 751 and 752. The operation of the control calculating unit 760 will be described later.

When the polarizer 1310 is used, if the intensity of one of the polarized waves is transmitted, the intensity of the other polarized wave is blocked and therefore, the intensities of the X-polarized wave and the Y-polarized wave may be detected in a time division manner by operating the polarization rotator 710. Thus, a simplified configuration is enabled.

Figure 14A:
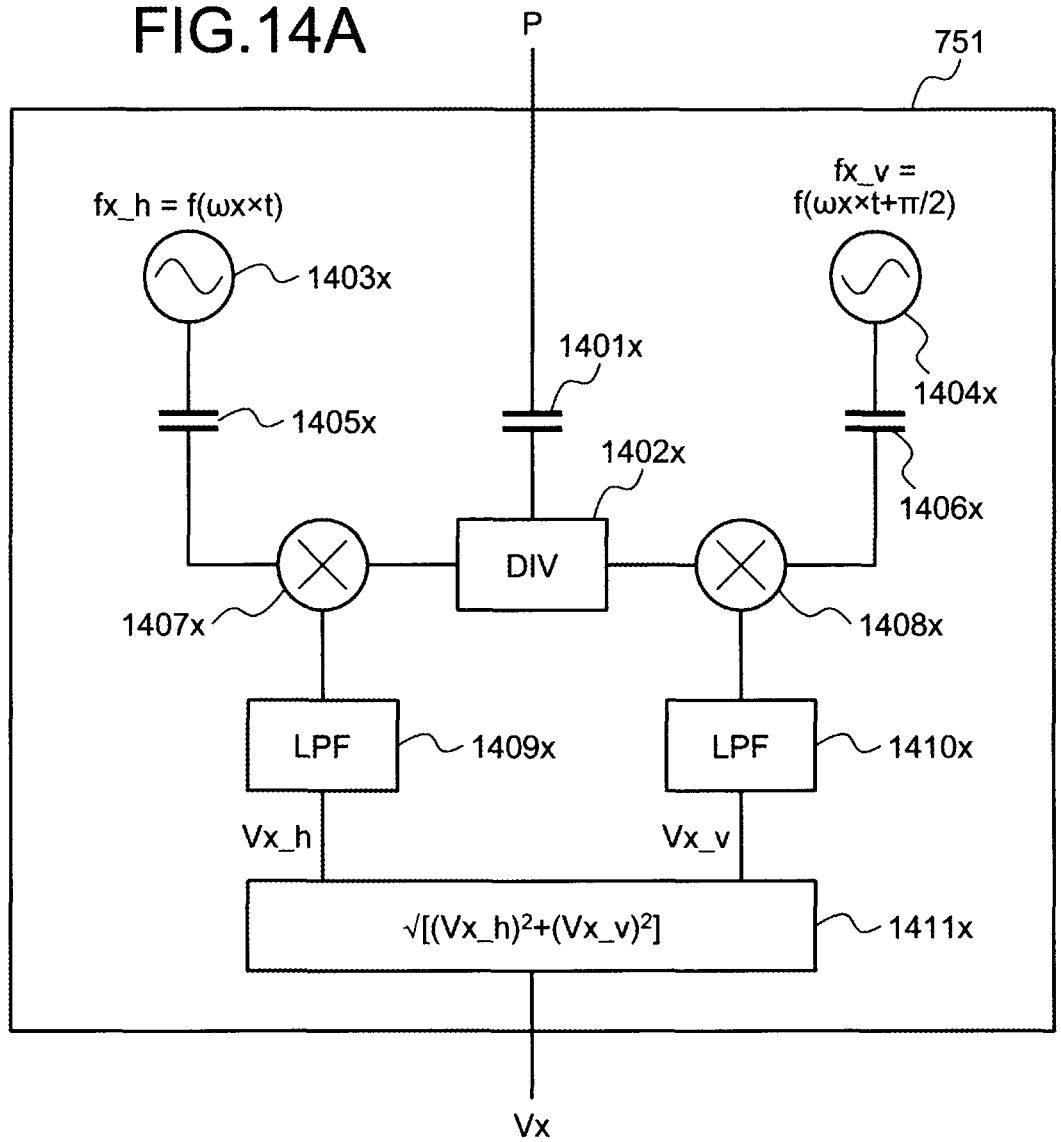
FIG. 14A is a diagram of an example of a configuration of the synchronous detection circuit (X-polarization) depicted in FIG. 13.

FIG. 14A is a diagram of an example of a configuration of the synchronous detection circuit (X-polarization) depicted in FIG. 13. As depicted in FIG. 14A, the synchronous detection circuit 751 depicted in FIG. 13 includes capacitors 1401x, 1405x, 1406x, a branching unit 1402x, oscillators 1403x, 1404x, multiplying units 1407x, 1408x, LPFs 1409x, 1410x, and a calculating unit 1411x.

The capacitors 1401x, 1405x, 1406x, the branching unit 1402x, the oscillators 1403x, 1404x, the multiplying units 1407x, 1408x, the LPFs 1409x, 1410x, and the calculating unit 1411x have the same configurations as the capacitors 801x, 805x, 806x, the branching unit 802x, the oscillators 803x, 804x, the multiplying units 807x, 808x, the LPFs 809x, 810x, and the calculating unit 811x depicted in FIG. 8A. However, the signal P output from the TIA 741 is input into the branching unit 1402x, via the capacitor 1401x.

FIG. 14B is a diagram of an example of a configuration of the synchronous detection circuit (Y-polarization) depicted in FIG. 13. As depicted in FIG. 14B, the synchronous detection circuit 752 depicted in FIG. 13 includes capacitors 1401y, 1405y, 1406y, a branching unit 1402y, oscillators 1403y, 1404y, multiplying units 1407y, 1408y, LPFs 1409y, 1410y, and a calculating unit 1411y.

The capacitors 1401y, 1405y, 1406y, the branching unit 1402y, the oscillators 1403y, 1404y, the multiplying units 1407y, 1408y, the LPFs 1409y, 1410y, and the calculating unit 1411y have the same configurations as the capacitors 801y, 805y, 806y, the branching unit 802y, the oscillators 803y, 804y, the multiplying units 807y, 808y, the LPFs 809y, 810y, and the calculating unit 811y depicted in FIG. 8B. However, the signal P output from the TIA 741 is input into the branching unit 1402y, via the capacitor 1401y.

FIG. 15 is a flowchart of an operation example of the control calculating unit depicted in FIG. 13. The control calculating unit 760 depicted in FIG. 13 executes steps depicted in FIG. 15, for example. First, the control calculating unit 760 stores the signal Vx output from the synchronous detection circuit 751 as a signal vx1 (step S1501).

The control calculating unit 760 changes a polarization rotation amount of the polarization rotator 710 in the forward direction by a constant amount (e.g., 5 [deg]) (step S1502). The control calculating unit 760 stores the signal Vx output from the synchronous detection circuit 751 as a signal vx2 (step S1503).

The control calculating unit 760 determines whether Vx1>Vx2 is satisfied based on the signals Vx1 and Vx2 stored at steps S1501 and S1503 (step S1504). If Vx1>Vx2 is not satisfied (step S1504: NO), the control calculating unit 760 changes the polarization rotation amount of the polarization rotator 710 in the forward direction by a constant amount until the signal Vx is maximized (step S1505) and goes to step S1507.

If Vx1>Vx2 is satisfied at step S1504 (step S1504: YES), the control calculating unit 760 changes the polarization rotation amount of the polarization rotator 710 in the backward direction by a constant amount until the signal Vx is maximized (step S1506) and goes to step S1507. At step S1507, the control calculating unit 760 stores, as Vx3, the signal Vx at this point (step S1507).

The control calculating unit 760 stores, as a signal vy1, the signal Vy output from the synchronous detection circuit 752 (step S1508). The control calculating unit 760 changes the polarization rotation amount of the polarization rotator 710 in the forward direction by a constant amount (e.g., 5 [deg]) (step S1502). The control calculating unit 760 stores the signal Vy output from the synchronous detection circuit 752 as a signal vy2 (step S1510).

The control calculating unit 760 determines whether Vy1>Vy2 is satisfied based on the signals Vy1 and Vy2 stored at steps S1508 and S1510 (step S1511). If Vy1>Vy2 is not satisfied (step S1511: NO), the control calculating unit 760 changes the polarization rotation amount of the polarization rotator 710 in the forward direction by a constant amount until the signal Vy is maximized (step S1512). The control calculating unit 760 goes to step S1514.

If Vy1>Vy2 is satisfied at step S1511 (step S1511: YES), the control calculating unit 760 changes the polarization rotation amount of the polarization rotator 710 in the backward direction by a constant amount until the signal Vy is maximized (step S1513). The control calculating unit 760 goes to step S1514.

At step S1514, the control calculating unit 760 stores, as Vy3, the signal Vy at this point (step S1514). The control calculating unit 760 outputs a ratio Vx3/vy3 based on Vx3 stored at step S1507 and Vy3 stored at step S1514 as the reception intensity ratio information (step S1515) and terminates the series of operations. The steps described above enable the acquisition of the reception intensity ratio information indicative of the intensity ratio of the X-polarized wave and the Y-polarized wave included in the signal light received by the optical receiving device 130.

Figure 16A:
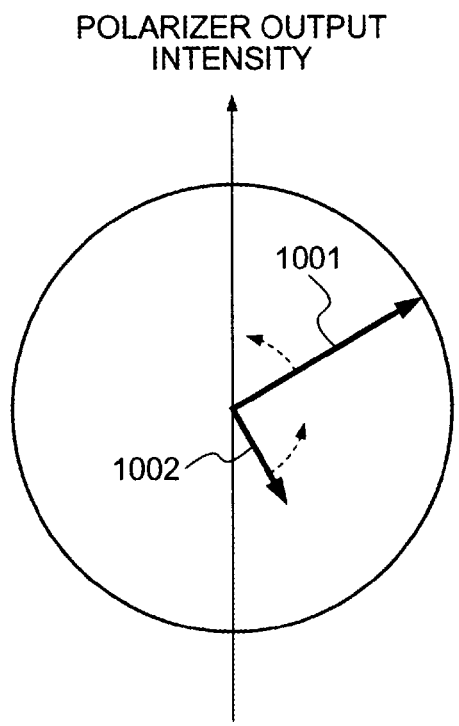
FIG. 16A is a diagram (part 1) of an example of the control of the polarization rotator.
Figure 16B:
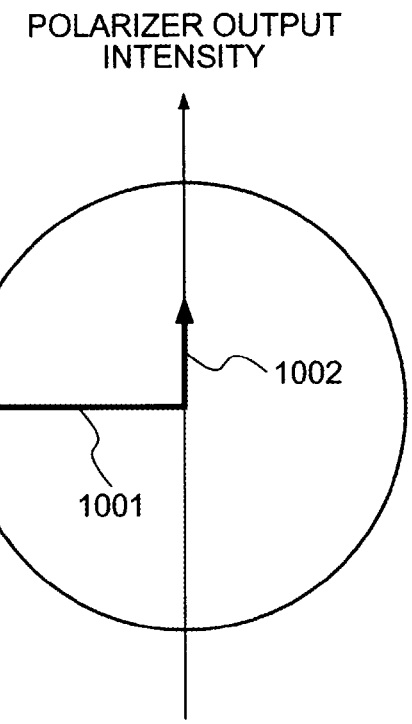
FIG. 16B is a diagram (part 2) of an example of the control of the polarization rotator.
Figure 16C:
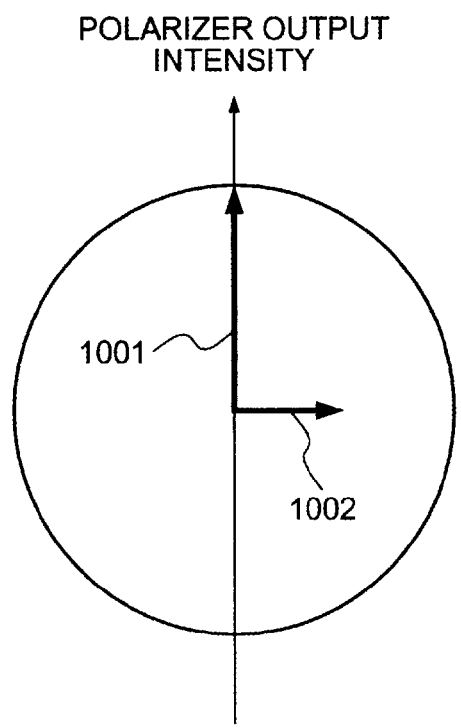
FIG. 16C is a diagram (part 3) of an example of the control of the polarization rotator.

FIG. 16A is a diagram (part 1) of an example of the control of the polarization rotator. FIG. 16B is a diagram (part 2) of an example of the control of the polarization rotator. FIG. 16C is a diagram (part 3) of an example of the control of the polarization rotator. In FIGS. 16A to 16C, components identical to the components depicted in FIG. 10A are denoted by the same reference numerals used in FIG. 10A and will not be described. It is assumed that the signal light transmitted from the optical transmitting device 110 has a polarization direction rotated in the optical network 120 as depicted in FIG. 16A.

The control calculating unit 760 can control the polarization rotation amount of the polarization rotator 710 to maximize the signal Vx output from the synchronous detection circuit 751, thereby achieving the state of FIG. 16B. Thus, the acquisition of intensity (Vx3) of the X-polarized wave included in the signal light received by the optical receiving device 130 is enabled.

The control calculating unit 760 can control the polarization rotation amount of the polarization rotator 710 to maximize the signal Vy output from the synchronous detection circuit 752, thereby achieving the state of FIG. 16C. Thus, the acquisition of intensity (Vy3) of the Y-polarized wave included in the signal light received by the optical receiving device 130 is enabled.

The control calculating unit 760 calculates a ratio Vx3/Vy3 of the intensity (Vx3) of the X-polarized wave calculated in the state of FIG. 16B and the intensity (Vy3) of the Y-polarized wave calculated in the state of FIG. 16C, thereby enabling the acquisition of the reception intensity ratio information indicative of the intensity ratio of the X-polarized wave and the Y-polarized wave included in the signal light received by the optical receiving device 130.

Figure 17:
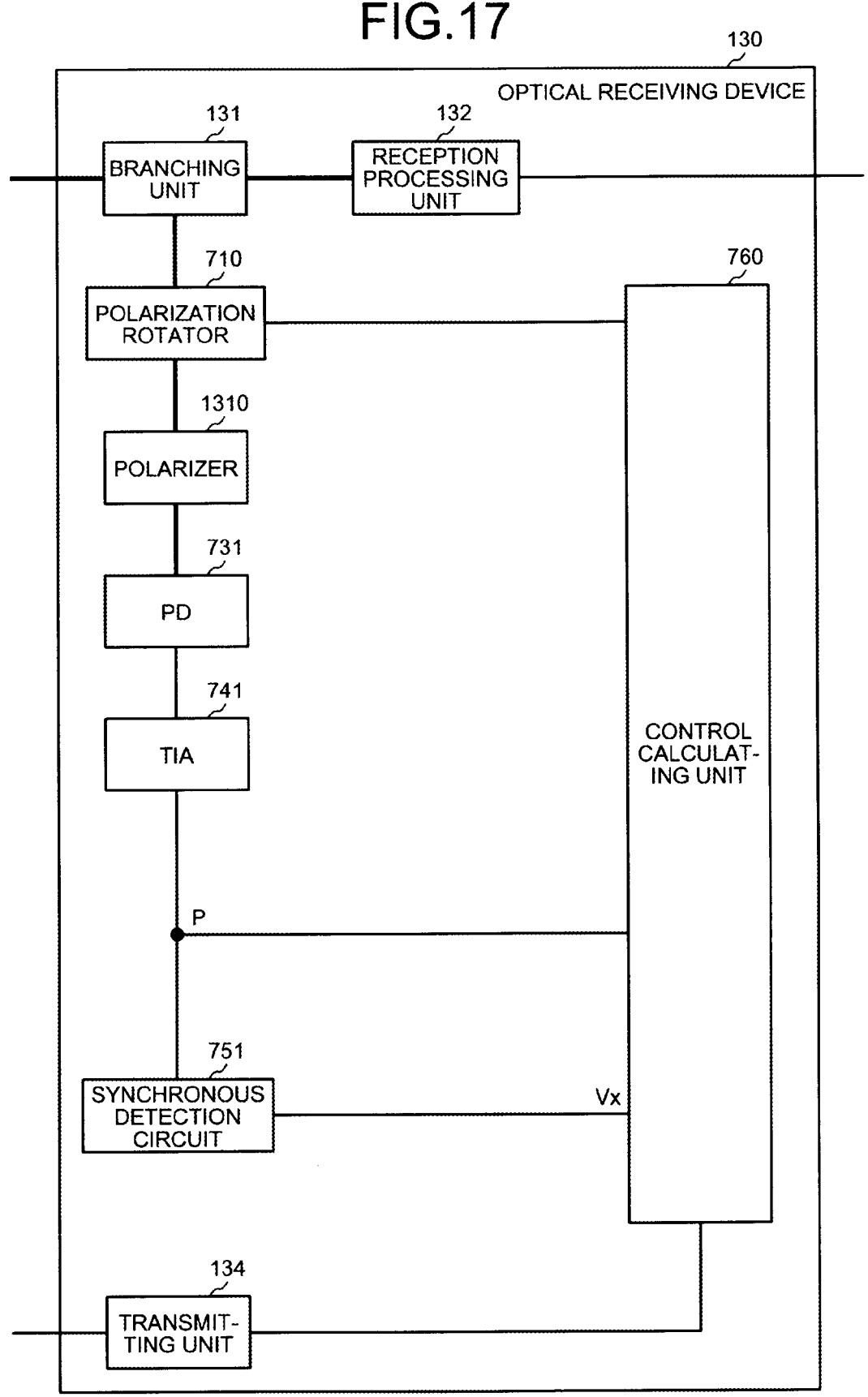
FIG. 17 is a diagram of a modification of the optical receiving device depicted in FIG. 13.

FIG. 17 is a diagram of a modification of the optical receiving device depicted in FIG. 13. In FIG. 17, components identical to the components depicted in FIG. 13 are denoted by the same reference numerals used in FIG. 13 and will not be described. The optical receiving device 130 depicted in FIG. 17 is the optical receiving device 130 corresponding to the optical transmitting device 110 depicted in FIG. 5B. In other words, if a component of the frequency fx is superimposed onto the signal light for X-polarization and a component of the frequency fy is not superimposed onto the signal light for Y-polarization as in the optical transmitting device 110 depicted in FIG. 5B, the optical receiving device 130 can be configured as depicted in FIG. 17.

The TIA 741 depicted in FIG. 17 outputs the signal P to the synchronous detection circuit 751 and the control calculating unit 760. In the configuration depicted in FIG. 17, the synchronous detection circuit 752 depicted in FIG. 15 may be eliminated. The control calculating unit 760 controls the polarization rotator 710 and calculates an intensity ratio of the X-polarized wave and the Y-polarized wave based on the signal P output from the TIA 741 and the signal Vx output from the synchronous detection circuit 751. For example, the configuration depicted in FIG. 14A is applicable to the synchronous detection circuit 751 depicted in FIG. 17.

FIG. 18 is a flowchart of an operation example of the control calculating unit depicted in FIG. 17. The control calculating unit 760 depicted in FIG. 17 executes steps depicted in FIG. 18, for example. Steps S1801 to S1806 depicted in FIG. 18 are the same as steps S1501 to S1506 depicted in FIG. 15. At step S1807, the control calculating unit 760 stores, as Px, the signal P output from the TIA 741 at this point (step S1807).

The control calculating unit 760 determines whether Vx1<Vx2 is satisfied based on the signals Vx1 and Vx2 stored at steps S1801 and S1803 (step S1808). If Vx1<Vx2 is not satisfied (step S1808: NO), the control calculating unit 760 changes the polarization rotation amount of the polarization rotator 710 in the forward direction by a constant amount until the signal Vx output from the synchronous detection circuit 751 is minimized (step S1809). The control calculating unit 760 goes to step S1811.

If Vx1<Vx2 is satisfied at step S1808 (step S1808: YES), the control calculating unit 760 changes the polarization rotation amount of the polarization rotator 710 in the backward direction by a constant amount until the signal Vx output from the synchronous detection circuit 751 is minimized (step S1810). The control calculating unit 760 goes to step S1811.

At step S1811, the control calculating unit 760 stores, as Py, the signal P output from the TIA 741 at this point (step S1811). The control calculating unit 760 outputs a ratio Px/Py based on Px stored at step S1807 and Py stored at step S1811 as the reception intensity ratio information (step S1812) and terminates the series of operations. The steps described above enable the acquisition of the reception intensity ratio information indicative of the intensity ratio of the X-polarized wave and the Y-polarized wave included in the signal light received by the optical receiving device 130.

FIG. 19A is a diagram of a third example of configuration of the optical transmitting device according to the embodiment. In FIG. 19A, components identical to the components depicted in FIG. 1 are denoted by the same reference numerals used in FIG. 1 and will not be described. As depicted in FIG. 19A, the intensity adjusting elements 115x and 115y of the optical transmitting device 110 can be implemented by a polarization rotating unit 1910 and a PDL element 1920.

The polarization rotating unit 1910 rotates the polarization direction of the signal light emitted from the coupler 116b. For example, the polarization rotating unit 1910 includes a λ/2 plate 1911 and a λ/4 plate 1912. Each of the λ/2 plate 1911 and the λ/4 plate 1912 is a wavelength plate that can be varied in angle by the intensity ratio control unit 118. The polarization rotating unit 1910 outputs to the PDL element 1920, the signal light having a polarization direction rotated by the λ/2 plate 1911 and the λ/4 plate 1912.

The PDL element 1920 transmits only a component of a predetermined polarization direction of the signal light emitted from the polarization rotating unit 1910 and sends out the component to the optical network 120.

The intensity ratio control unit 118 controls the angles of the λ/2 plate 1911 and the λ/4 plate 1912 to adjust the rotation amount in the polarization direction of the signal light in the polarization rotating unit 1910, thereby enabling the control of the intensity ratio of the X-polarized component and the Y-polarized component included in the signal light emitted from the PDL element 1920.

Figure 19B:
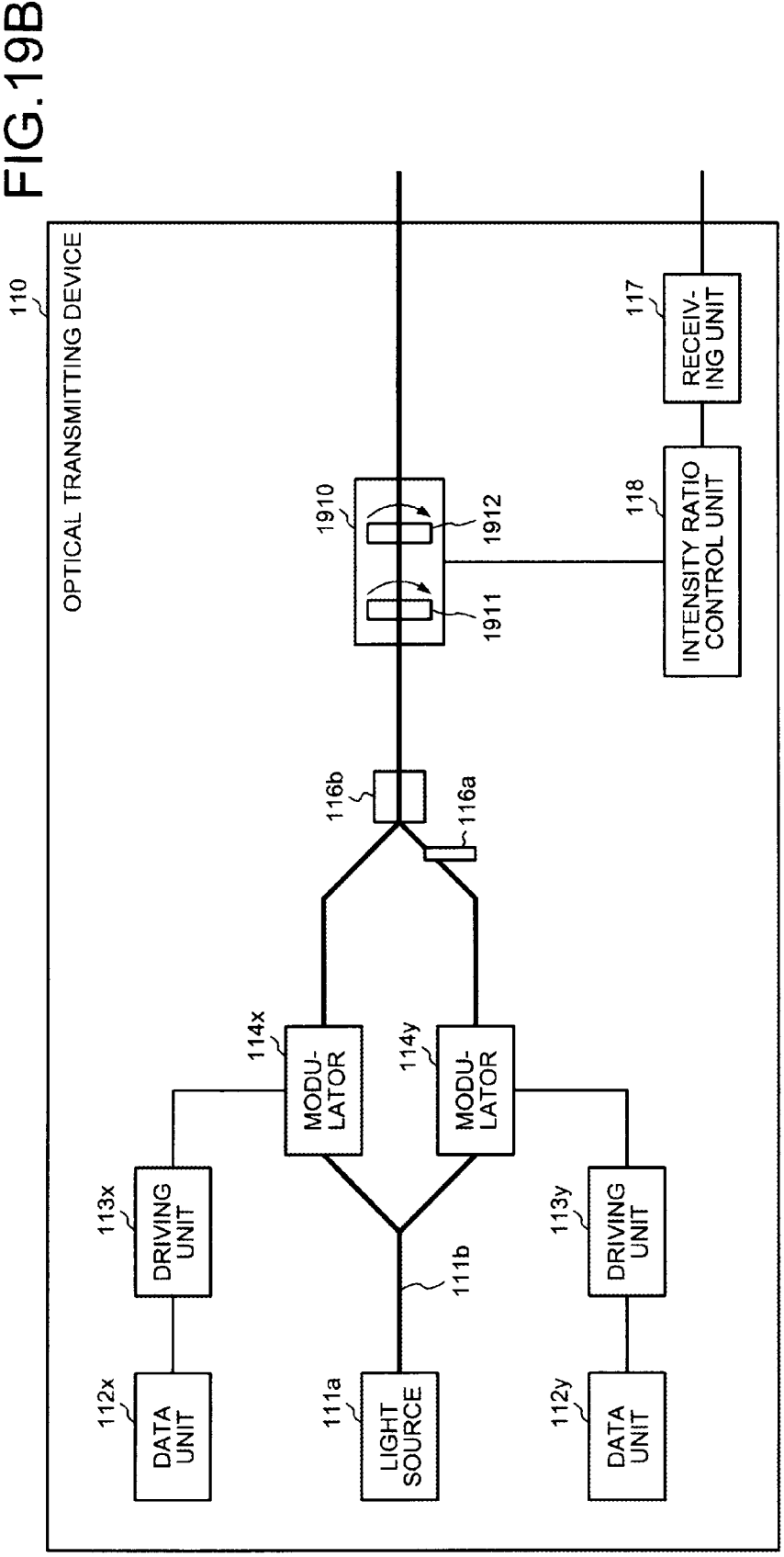
FIG. 19B is a diagram of a modification of the optical transmitting device depicted in FIG. 19A.

FIG. 19B is a diagram of a modification of the optical transmitting device depicted in FIG. 19A. In FIG. 19B, components identical to the components depicted in FIG. 19A are denoted by the same reference numerals used in FIG. 19A and will not be described. The optical network 120 has a PDL element as indicated by the PDL element 241 of FIG. 2. Therefore, as depicted in FIG. 19B, the optical transmitting device 110 may have a configuration without the PDL element 1920, thereby enabling the control of the intensity ratio of the X-polarized component and the Y-polarized component included in the signal light transmitted through the optical network 120.

If the configurations depicted in FIGS. 19A and 19B are used, the polarization state of the signal light transmitted from the optical transmitting device 110 is changed by operating the polarization rotating unit 1910. Therefore, the feedback control method described above is not directly applicable since the method is based on the assumption that the polarization state from the optical transmitting device 110 to the optical receiving device 130 is static to a response of the feedback control. Operation of the intensity ratio control unit 118 in the configurations depicted in FIGS. 19A and 19B will be described.

FIG. 20 is a flowchart of an example of operation of the intensity ratio control unit depicted in FIGS. 19A and 19B. The intensity ratio control unit 118 depicted in FIGS. 19A and 19B executes the following steps, for example.

First, the intensity ratio control unit 118 changes and adjusts the angle of the λ/2 plate 1911 of the polarization rotating unit 1910 by 90 [degrees] at a time to an angle making TXratio×RXratio closest to one (step S2001). As a result, the angle of the λ/2 plate 1911 can be adjusted to be shifted less than 90 [deg] from the optimum angle.

The intensity ratio control unit 118 changes and adjusts the angle of the λ/4 plate 1912 of the polarization rotating unit 1910 by 180 [degrees] at a time to an angle making TXratio×RXratio closest to one (step S2002). As a result, the angle of the λ/4 plate 1912 can be adjusted to be shifted less than 180 [deg] from the optimum angle.

The intensity ratio control unit 118 changes and adjusts the angle of the λ/2 plate 1911 of the polarization rotating unit 1910 by 10 [degrees] at a time to an angle making TXratio×RXratio closest to one (step S2003). As a result, the angle of the λ/2 plate 1911 can be adjusted to be shifted less than 10 [deg] from the optimum angle.

The intensity ratio control unit 118 changes and adjusts the angle of the λ/4 plate 1912 of the polarization rotating unit 1910 by 10 [degrees] at a time to an angle making TXratio×RXratio closest to one (step S2004). As a result, the angle of the λ/4 plate 1912 can be adjusted to be shifted less than 10 [deg] from the optimum angle. After the step S2004, the intensity ratio control unit 118 returns to the step S2003.

As described, the intensity ratio control unit 118 first changes the polarization angle of each of the λ/2 plate 1911 and the λ/4 plate 1912 by a larger change unit amount (90 [deg] and 180 [deg] in the example depicted in FIG. 20) to set a polarization state to be adjusted. The intensity ratio control unit 118 then changes the polarization angle of each of the λ/2 plate 1911 and the λ/4 plate 1912 by a smaller change unit amount (10 [deg] in the example depicted in FIG. 20) to set a more optimal polarization angle.

FIG. 21 is a diagram of an example of the optical transceiving apparatus depicted in FIG. 1. In FIG. 21, components identical to the components depicted in FIG. 1 are denoted by the same reference numerals used in FIG. 1 and will not be described. As depicted in FIG. 21, a branching unit 2101 may be provided at the output end of the optical transmitting device 110. The optical transmitting device 110 includes an intensity acquiring unit 2102 in addition to the configuration depicted in FIG. 1.

The branching unit 2101 branches the signal light sent out from the optical transmitting device 110 and outputs the respective branches of the signal light to the optical network 120 and the intensity acquiring unit 2102. The intensity acquiring unit 2102 is a transmission side acquiring unit acquiring transmission intensity ratio information indicative of an intensity ratio of the X-polarized component and the Y-polarized component included in the signal light from the branching unit 2101 to output the acquired transmission intensity ratio information to the intensity ratio control unit 118. The intensity acquiring unit 2102 can be implemented by the same constituent elements as those of the intensity acquiring unit 133 described above.

The intensity ratio control unit 118 adjusts manipulation amounts of the intensity adjusting elements 115x and 115y such that a constant value is acquired as a product of the intensity ratio indicated by the transmission intensity ratio information output from the intensity acquiring unit 2102 and an intensity ratio indicated by the reception intensity ratio information output from the receiving unit 117. As a result, the product of an intensity ratio of the X-polarized component and the Y-polarized component included in the signal light transmitted from the optical transmitting device 110 and an intensity ratio of the X-polarized component and the Y-polarized component included in the signal light received by the optical receiving device 130, can be controlled more accurately to the constant value.

In the example depicted in FIG. 21, a ratio is defined between the intensity of a main signal of each polarized wave and the amplitude [W] of intensity modulation using a superimposed signal. It is assumed that the amplitude of optical intensity modulation using the superimposed signal corresponding to 1 [W] of optical power of the main signal is amplitude N [W] (N<<1) for the X-polarized wave and the Y-polarized wave, respectively. The value of N is the same between the X-polarized wave and the Y-polarized wave.

As a result, if signal optical intensity changes in one polarized wave, the intensity modulation amplitude of the superimposed signal is also changed in proportion to the change. Therefore, when the amplitudes of optical intensities superimposed onto the X-polarized wave and the Y-polarized wave are detected to calculate an amplification ratio thereof, the result can be considered as a ratio between the optical main signal intensity of the X-polarized wave and the signal optical intensity of the Y-polarized wave.

The amplitude of amplitude modulation occurring in a transmitter of the QPSK modulation mode may be used. In this case, for example, after the amplitude modulation is band-limited by several hundred [MHz], the intensity or amplitude of the amplitude modulation can be detected for each polarized signal to calculate the amplitude ratio so as to acquire a ratio between the optical main signal intensity of the X-polarized wave and the signal optical intensity of the Y-polarized wave.

The amplitude N may be a value calculated with consideration of characteristics of individual components. In such a case, for example, the position at which the signal light is transmitted through the intensity adjusting elements 115x and 115y of FIG. 21 may be determined as a definition point. In this case, an optical circuit unit (e.g., the coupler 116b) downstream from the intensity adjusting elements 115x and 115y may be considered to be included in the optical network 120. In this case, a configuration is not needed that calculates the signal intensities of the X-polarized wave and the Y-polarized wave in an optical output unit of the optical transmitting device 110 as described below.

In the configuration of the example depicted in FIG. 21, the branching unit 2101 is disposed at the optical output unit of the optical transmitting device 110 to calculate a ratio of signal intensities of the X-polarized wave and the Y-polarized wave. By disposing the branching unit 2101, a ratio of signal intensities of the X-polarized wave and the Y-polarized wave in the optical output unit of the optical transmitting device 110 can be calculated from actually measured results and more accurate compensation can be achieved.

FIG. 22A is a diagram of a first example of configuration of the optical receiving device depicted in FIG. 21. In FIG. 22A, components identical to the components depicted in FIG. 13 are denoted by the same reference numerals used in FIG. 13 and will not be described. As depicted in FIG. 22A, the optical receiving device 130 may include a calculating unit 2211 instead of the polarization rotator 710, the polarizer 1310, and the control calculating unit 760 depicted in FIG. 13. The PD 731 converts the signal light from the branching unit 131 into an electrical signal. Therefore, the signal P output from the TIA 741 includes the X-polarized component and the Y-polarized component.

The synchronous detection circuit 751 extracts, via synchronous detection, a signal component of the frequency fx included in the signal P output from the TIA 741 and outputs the extracted signal component as a signal Vx to the calculating unit 2211. The synchronous detection circuit 752 extracts, via synchronous detection, a signal component of the frequency fy included in the signal P output from the TIA 742 and outputs the extracted signal component as a signal Vy to the calculating unit 2211. The configurations depicted in FIGS. 14A and 14B can be used for the synchronous detection circuits 751 and 752, respectively.

The calculating unit 2211 calculates an intensity ratio of the X-polarized wave and the Y-polarized wave included in the signal light received by the optical receiving device 130 based on the signals Vx and Vy output from the synchronous detection circuits 751 and 752. For example, the calculating unit 2211 calculates a ratio Vx/Vy based on the signals Vx and Vy and outputs the calculated ratio Vx/Vy as the reception intensity ratio information to the transmitting unit 134.

The synchronous detection of the synchronous detection circuits 751 and 752 can remove (reduce) noise and other signal components. Therefore, accurate reception intensity ratio information can be acquired even from signals deteriorated in signal quality due to increase in optical noise after transmission through the optical network 120.

For example, if only the X-polarized signal light is intensity-modulated by the frequency fx, the amplitude of the intensity modulation superimposed onto the X-polarized signal light can be detected by the synchronous detection circuit 751 depicted in FIG. 22A. For example, the signal Vx output from the synchronous detection circuit 751 can be multiplied by 1/N to acquire the intensity of the X-polarized signal light.

The intensity of the Y-polarized signal light can be acquired as the intensity obtained by subtracting the intensity of the X-polarized signal light from the average intensity of the signal P linearly amplified by the PD 731 and the TIA 741. As a result, the reception intensity ratio information can be acquired even if the X-polarized signal light alone is intensity-modulated by the frequency fx.

FIG. 22B is a diagram of a second example of configuration of the optical receiving device depicted in FIG. 21. In FIG. 22B, components identical to the components depicted in FIG. 22A are denoted by the same reference numerals used in FIG. 22A and will not be described. As depicted in FIG. 22B, the optical receiving device 130 may include BPFs 2221 and 2222 instead of the synchronous detection circuits 751 and 752 depicted in FIG. 22A. The TIA 741 outputs the signal P to the BPFs 2221 and 2222.

The band pass filter (BPF) 2221 extracts only the band of the frequency fx included in the signal P output from the TIA 741 and outputs the extracted signal component as the signal Vx to the calculating unit 2211. The BPF 2222 extracts only the band of the frequency fy included in the signal P output from the TIA 741 and outputs the extracted signal component as the signal Vy to the calculating unit 2211. As described, the BPFs 2221 and 2222 may be used for acquiring the intensities of the X-polarized signal component and the Y-polarized signal component received by the optical receiving device 130.

The frequencies fx and fy of the low frequency signals superimposed in the optical transmitting device 110 will be described. It is preferable to set the frequencies fx and fy such that the amplitudes of the frequencies fx and fy of the control signals of the intensity adjusting elements 115$x$ and 115$y$ are not affected by the feedback control, etc. adjusting the intensities in the intensity adjusting elements 115$x$ and 115$y$. For example, if compensation is provided such that the intensity modulation up to 10 [kHz] is canceled by the feedback control of the intensity adjusting elements 115$x$ and 115$y$, it is preferable to select a frequency equal to or higher than 100 [kHz], which is one order of magnitude higher than the frequencies fx and fy.

The frequencies fx and fy are set to unique frequencies as the intensity modulation frequencies from the output of the optical transmitting device 110 to the input of the optical receiving device 130. For example, intensity modulation is performed at a given frequency for the control inside the optical transmitting device 110, the frequencies fx and fy are set in a shifted manner so as not to interfere with the frequency. However, this is not the case if the controls are provided in a time division manner and no interference occurs between the controls.

Description will be made of the case that high-speed polarization fluctuation occurs in the optical network 120 relative to the response speed of feedback control during the feedback control.

It is known that the polarization state and PDL of the optical network 120 fluctuate particularly when a shape of the optical fiber changes. For example, if the fiber is expanded or contracted due to temperature change or the optical fiber is deformed due to physical impact or vibration from a person or an object, a fluctuation of a polarization angle θ(dθ/dt) occurs according to the speed of deformation of the optical fiber. In the signal light passing through the optical network 120 and having the fluctuated polarization angle θ, a polarization dependent loss fluctuation (−dG/dt) occurs.

While the optical fiber is normally laid in stable environment and dθ/dt and −dG/dt are changed to the extent that consideration is given to environmental temperature change, the feedback control of the optical transceiving apparatus 100 preferably has a response speed to the extent that the control adequately keeps pace with the speed of change. For example, compensation is made for a change in state on the order of a few seconds to several tens of seconds.

However, if physical impact or vibration is transiently applied by a person or an object, the response of the feedback control configured on the order of a few seconds cannot keep pace with the impact or vibration and may lead to a malfunction. For example, if a person touches the optical fiber (e.g., on the order of about 314 [rad/msec]), dθ/dt and −dG/dt may lead to a malfunction.

For example, in the detection configuration using the synchronous detection circuits 751, 752, and BPFs 2221, 2222, a change dV/dt of a detection value may be monitored to provide control of making the detection value invalid if the change is unstable. In this case, the optical transmitting device 110 may have a malfunction prevention function of suspending update of a manipulation value (temporarily retaining a manipulation value) of the feedback control, for example. As a result, malfunction can be avoided.

For example, the optical transmitting device 110 depicted in FIGS. 19A and 19B may be provided with a configuration monitoring the occurrence of a high-speed amplitude change different from the loss fluctuation (−dG/dt) due to the manipulation speed (dθ/dt) of the polarization angle. As a result, malfunction can be avoided. The optical transmitting device 110 may be configured to detect the occurrence of high-speed fluctuation of the polarization angle and notify an administrator to give a warning.

An example of compensation of OSNR within a generally assumed PDL range in the optical transmitting device 110 will be described.

For example, it is assumed that the optical network 120 is an eight-span optical amplification system generating a PDL of 0.8 [dB] per span without a shift of intensity between the polarized waves of the optical transmitting device 110. It is assumed that the PDL of the optical network 120 is smaller in the X-polarized wave (e.g., 0 [dB]) and always larger in the Y-polarized wave (e.g., 0.8 [dB]).

The input signal intensity of the X-polarized wave and the Y-polarized wave to the optical amplifier 211 (see FIG. 2) at the first stage is Pin_AMP_1_in, which is assumed to be Pin_AMP_1_in=−16.0 [dBm]. The input signal intensity to the optical amplifier 211 at an N-th stage (N=2, 3, 4, . . . ) is Pin_AMP_N_in. Pin_AMP_N_in of the X-polarized wave is assumed to be −16.0 [dBm]+0×N [dBm]=−16.0 [dBm] (constant). Pin_AMP_N_in of the Y-polarized wave is assumed to be −16.0 [dBm]−0.8×N [dBm]. NF=5.0 [dB] and Bo=0.1 [nm] are used.

From $h \approx 6.626068 \times 10^{-34}$ [m$^2$×kg/s] and $v=C/\lambda \approx 2.99792458 \times 10^8/1.55 \times 10^{-6}$ [Hz] $\Delta f = (C/\lambda^2) \times Bo$, $-10 \times LOG(h \times v \Delta f/10^{-3}) \approx 57.9$ [dBm] is obtained. The model of the eight-span optical network 120 corresponds to the configuration of the optical network 120 of FIG. 2 when N=8.

<Before Compensation by Feedback Control>

If the feedback control of the optical transceiving apparatus 100 is not provided, the X-polarization OSNR≈about 27.9 [dB] and the X-polarization intensity≈−16.0 [dBm] are generated at the input end of the optical receiving device 130. The Y-polarization OSNR≈24.7 [dB] and the Y-polarization intensity≈−22.4 [dBm] are generated. Therefore, the Y-polarized wave is deteriorated to a greater extent of about 3 [dB] as compared to the X-polarized wave.

<First Compensation Example of Feedback Control>

Description will be made of the case where the feedback control by the optical transceiving apparatus 100 is provided while a sum of the signal light intensities polarization-multiplexed in the optical transmitting device 110 is retained. From Equation (8) described above, a value of X≈−0.157 is derived. When X≈−0.157 is applied to the manipulation of the X-polarization intensity and the Y-polarized intensity of the optical transmitting device 110, Pin_AMP_1_in is set to −17.6 [dBm] and −14.8 [dBm] for the X-polarized wave and the Y-polarized wave, respectively. These are control targets of the feedback control by the optical transceiving apparatus 100.

In the manipulation in the optical transmitting device 110, the intensities of the X-polarized wave and the Y-polarized wave are decreased or increased by −1.6 [dB] and 1.2 [dB], respectively, from the original state. Therefore, the X-polarization OSNR≈26 [dB] and the X-polarization intensity≈−17.6 [dBm] are obtained. The Y-polarization OSNR≈26 [dB] and the Y-polarization intensity≈−21.2 [dBm] are obtained.

As a result, although the X-polarization OSNR deteriorates from 27.9 [dB] to 26 [dB] before and after the application of the feedback control by the optical transmitting device 110, the Y-polarization OSNR defining the OSNR limit is improved from 24.7 [dB] to 26 [dB].

Although the intensities of the X-polarized wave and the Y-polarized wave are different at the output unit of the optical transmitting device 110 and at the input unit of the optical receiving device 130, the OSNRs of the X-polarized wave and the Y-polarized wave are substantially equivalent values at the input unit of the optical receiving device 130. After the application of the feedback control by the optical transceiving apparatus 100, the distribution of the intensities of the X-polarized wave and the Y-polarized wave in the optical network 120 is equalized and deterioration in signal quality due to a nonlinear phenomenon is hardly induced at the same time.

<Second Compensation Example of Feedback Control>

A second example of another compensation of OSNR by the optical transceiving apparatus 100 will be described. The first compensation example is an example in a case of reducing the intensity of the X-polarized wave and increasing the intensity of the Y-polarized wave in the optical transmitting device 110 to make the sum of the polarization multiplexed signal intensities equal before and after the compensation. On the other hand, in the second compensation example, description will be made of a case where the optical transmitting device 110 has no configuration for increasing the intensity of light and can only attenuate light.

In this case, Pin_AMP_1_in is set to −19.2 [dBm] and −16.0 [dBm] for the X-polarized wave and the Y-polarized wave, respectively. The X-polarization OSNR≈24.7 [dB] and the X-polarization intensity≈−19.2 [dBm] are obtained in the input unit of the optical receiving device 130. The Y-polarization OSNR≈24.7 [dB] and the Y-polarization intensity≈−22.4 [dBm] are obtained.

Since the intensity of the Y-polarized wave is not manipulated in this example, the OSNR and intensity of the input unit of the optical receiving device 130 do not change. The OSNR of the X-polarized wave is deteriorated to the same value as the OSNR of the Y-polarized wave and the intensity thereof is reduced.

In the second compensation example, the intensity of the X-polarized wave is reduced to obtain the same OSNR as the Y-polarization OSNR defining the OSNR limit and, while the overall OSNR of the polarization multiplexed signal light is deteriorated, the OSNR limit of each polarized signal does not change from 24.7 [dB]. Therefore, although no significant difference is made in a transmittable distance due to the OSNR limit before and after the compensation, since the intensity of the X-polarized wave is reduced, the deterioration in signal quality due to a nonlinear phenomenon is hardly induced.

Both the first and second compensation examples achieve a state in which the deterioration in signal quality due to a nonlinear phenomenon is hardly induced. On the other hand, to improve the overall OSNR of the signal light in the optical receiving device 130, the optical transmitting device 110 preferably has such a configuration that increases the intensity of the X-polarized wave or the Y-polarized wave.

A case of an abnormal PDL outside a generally assumed PDL range occurring in the optical transmission path in the first compensation example will be described. For example, it is assumed that an abnormal value of 6 [dB] is occurs in addition to a PDL of 0.8 [dB] of the fourth span in the middle of the eighth-span optical transmission path.

<Third Compensation Example of Feedback Control>

If the first compensation example is implemented in this case (third compensation example), Pin_AMP_1_in is set to −18.6 [dBm] and −14.4 [dBm] for the X-polarized wave and the Y-polarized wave, respectively. The X-polarization OSNR≈25.3 [dB] and the X-polarization intensity≈−18.6 [dBm] are obtained in the input unit of the optical receiving device 130. The Y-polarization OSNR≈26.3 [dB] and the Y-polarization intensity≈−20.8 [dBm] are obtained.

On the other hand, before the application of the feedback control by the optical transceiving apparatus 100, Pin_AMP_1_in is set to −16.0 [dBm] and −16.0 [dBm] for the X-polarized wave and the Y-polarized wave, respectively. The X-polarization OSNR≈27.9 [dB] and the X-polarization intensity≈−16.0 [dBm] are obtained in the input unit of the optical receiving device 130. The Y-polarization OSNR≈19.9 [dB] and the Y-polarization intensity≈−28.4 [dBm] are obtained.

Comparing before and after the third compensation example of the feedback control of the optical transceiving apparatus 100, it is understood that the third compensation example improves OSNR of a given polarized wave (Y-polarized wave in this case) (from 24.7 [dB] and 19.9 [dB] to 25.3 [dB])

However, comparing the first compensation example and the third compensation example, although the OSNRs of the X-polarized wave and the Y-polarized wave of the input unit of the optical receiving device 130 are compensated to substantially the same value in the first compensation example, it is understood that the OSNRs are shifted from each other by about 1 [dB] between the polarized waves in the third compensation example. This is because the occurrence of an abnormal PDL in a given span increases the bias of optical noise added by the optical amplifiers 211 on the subsequent stages between the polarized waves and thereby, increasing the bias of the OSNRs.

Since an abnormal PDL occurs in the optical transmission path, the manipulation amount of the output intensity of the optical transmitting device 110 is larger in the third compensation example than the first compensation example. For example, an intensity difference between the X-polarized wave and the Y-polarized wave reaches a value of 4 [dB] in the third compensation example.

The optical transmitting device 110 generally has a manipulatable intensity range for each polarized wave. For example, this corresponds to the setting limits of the drive voltages of the modulators 114x and 114y and the gain setting limits of the attenuators 421 and 422 and the amplifiers. Although this range may be determined as a manipulatable range on the assumption of PDL that may normally occurs in the optical transmission path, for example, if such an abnormal PDL occurs in the optical transmission path, the upper/lower limit of the preset range may be reached.

In this regard, it may be detected whether the upper/lower threshold value of the intensity manipulation range predetermined for at least one of the polarized waves in the optical transmitting device 110 is reached in the feedback control of the optical transceiving apparatus 100. The detection result in the optical transmitting device 110 may be supplied to an administrator as a PDL abnormality warning in the optical transmission path to monitor the state of the optical transmission path.

If the intensity manipulation of a given polarized wave in the optical transmitting device 110 reaches the lower limit of the manipulatable range while not reaching the upper limit, offset operation of increasing the intensity of the polarized wave may be performed in addition to the feedback control of the optical transceiving apparatus 100. As a result, the OSNR can be improved.

From a state in which the intensity manipulation of the Y-polarized wave of the optical transmitting device 110 reaches a lower limit value (maximum attenuation amount) due to the optical attenuator 422 through the feedback control, an offset may be applied to the intensity of the Y-polarized wave to increase the intensity. As a result, the OSNR of the Y-polarized wave is improved in the input unit of the optical receiving device 130.

As described, the optical transceiving apparatus, the optical transmitting method, and the optical transmitting device can adjust the magnitude relation of intensity of polarized components on the transmission side to be opposite to the magnitude relation of intensity of polarized components measured on the reception side. As a result, a difference in OSNR between the polarized components can be reduced or the deterioration in signal quality due to a nonlinear phenomenon can be suppressed. Therefore, transmission characteristics can be improved.

For example, it is conceivable that the respective OSNRs of the X-polarized signal and the Y-polarized signal in optical input of an optical receiver are measured so as to provide compensation such that a difference between the two OSNRs is eliminated. For example, it is conceivable that each of the OSNRs of the polarized signals is measured by using an optical spectrum analyzer.

However, if the optical transmission path is a WDM system and has a configuration of adding/dropping an optical channel, although signal light and optical noise are dropped, noise on a side band of the signal light is removed by band limitation of an optical frequency. Therefore, it is difficult to measure the OSNR with the optical spectrum analyzer.

If the optical receiver is a coherent optical receiver, a function is known that estimates an OSNR for each of the X- and Y-polarized waves with a DSP unit in the optical receiver. However, since the OSNR is not detected at the optical input end of the optical receiver and the detected OSNR includes a PDL in the optical receiver from the optical input to the DSP and other deteriorations in transmission characteristics, the signal light at the input end of the optical receiver cannot be compensated. The detection is also limited because a quantization error exists due to an analog/digital converter (ADC) upstream from the DSP.

In contrast, the optical transceiving apparatus 100 can reduce a difference in OSNR between polarized components without measuring the OSNRs of the polarized components.

One aspect of the present invention enables transmission characteristics to be improved.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical transmission system comprising:
an optical transmitting device performing polarization multiplexing on and transmitting as polarization multiplexed signal light, a first signal light of a predetermined polarization direction and a second signal light of a polarization direction different from the predetermined polarization direction;
an optical receiving device receiving the signal light transmitted from the optical transmitting device through an optical transmission path;
an acquiring unit acquiring information indicative of a ratio of intensity between the first signal light and the second signal light included in the signal light received by the optical receiving device; and
a control unit controlling the ratio of intensity between the first signal light and the second signal light included in the signal light output from the optical transmitting device such that a product of the ratio of intensity between the first signal light and the second signal light included in the signal light output and the ratio of intensity indicated by the information acquired by the acquiring unit comes close to a constant value, wherein
the first signal light is an X-polarized wave and the second signal light is a Y-polarized wave, and
the control unit changes the intensity of the X-polarized wave by an intensity manipulation amount X represented by the following equation:

$$X = \frac{(TXout\_Psig\_y\_pola) \times (RXin\_Psig\_y\_pola) - (TXout\_Psig\_x\_pola) \times (Rin\_Psig\_x\_pola)}{(TXout\_Psig\_x\_pola) + (TXout\_Psig\_y\_pola) + (RXin\_Psig\_x\_pola) + (RXin\_Psig\_y\_pola)}$$

where TXout Psig x pola is the intensity of the X-polarized wave transmitted from the optical transmitting device; TXout Psig y pola is the intensity of the Y-polarized wave transmitted from the optical transmitting device; RXin Psig x pola is the intensity of the X-polarized wave received by the optical receiving device; and RXin Psig y pola is the intensity of the Y-polarized wave received by the optical receiving device.

2. The optical transmission system according to claim 1, wherein the constant value is one.

3. The optical transmission system according to claim 1, comprising a superimposing unit superimposing onto at least one among the first signal light and the second signal light included in the signal light output, a signal component of a frequency that is different from the first signal light and the second signal light, wherein
the acquiring unit acquires the information indicative of the ratio, based on the intensity of the signal component included in the signal light received.

4. The optical transmission system according to claim 1, wherein
the control unit adjusts the intensity of at least one among the first signal light and the second signal light polarization-multiplexed by the optical transmitting device, to control the ratio of intensity between the first signal light and the second signal light included in the signal light output.

5. The optical transmission system according to claim 1, comprising an element inducing polarization dependent loss on the signal light output, wherein
the control unit rotates polarization of the signal light output, to control the ratio of intensity between the first signal light and the second signal light included in the signal light output.

6. The optical transmission system according to claim 1, comprising a transmission side acquiring unit acquiring information indicative of a ratio of intensity between the first signal light and the second signal light included in the signal light output, wherein
the control unit, based on the ratio indicated by the information acquired by the acquiring unit and the ratio indicated by the information acquired by the transmission side acquiring unit, controls the ratio of intensity between the first signal light and the second signal light included in the signal light output.

7. The optical transmission system according to claim 1, wherein the optical transmission path is an optical transmission path having polarization dependent loss.

8. An optical transmission method executed by a transmission system that includes an optical transmitting device performing polarization multiplexing on and transmitting as polarization multiplexed signal light, a first signal light of a predetermined polarization direction and a second signal light of a polarization direction different from the predetermined polarization direction and an optical receiving device receiving the signal light transmitted from the optical transmitting device through an optical transmission path, the optical transmission method comprising:
acquiring information indicative of a ratio of intensity between the first signal light and the second signal light included in the signal light received by the optical receiving device; and
controlling the ratio of intensity between the first signal light and the second signal light included in the signal light output from the optical transmitting device such that a product of the ratio of intensity between the first signal light and the second signal light included in the signal light output and the ratio of intensity indicated by the information acquired at the acquiring comes close to a constant value, wherein
the first signal light is an X-polarized wave and the second signal light is a Y-polarized wave, and
the controlling includes changing the intensity of the X-polarized wave by an intensity manipulation amount X represented by the following equation:

$$X = \frac{(TXout\_Psig\_y\_pola) \times (RXin\_Psig\_y\_pola) - (TXout\_Psig\_x\_pola) \times (Rin\_Psig\_x\_pola)}{(TXout\_Psig\_x\_pola) + (TXout\_Psig\_y\_pola) + (RXin\_Psig\_x\_pola) + (RXin\_Psig\_y\_pola)}$$

where TXout Psig x pola is the intensity of the X-polarized wave transmitted from the optical transmitting device; TXout Psig y pola is the intensity of the Y-polarized wave transmitted from the optical transmitting device; RXin Psig x pola is the intensity of the X-polarized wave received by the optical receiving device; and RXin Psig y pola is the intensity of the Y-polarized wave received by the optical receiving device.

9. An optical transmitting device comprising:
a polarization multiplexing unit performing polarization multiplexing on and outputting as polarization multiplexed signal light, a first signal light of a predetermined polarization direction and a second signal light of a polarization direction different from the predetermined polarization direction;
an acquiring unit acquiring information indicative of a ratio of intensity between the first signal light and the second signal light included in the signal light output from the polarization multiplexing unit through an optical transmission path and received by an optical receiving device; and
a control unit controlling the ratio of intensity between the first signal light and the second signal light included in the signal light output from the polarization multiplexing unit such that a product of the ratio of intensity between the first signal light and the second signal light included in the signal light output and the ratio of intensity indicated by the information acquired by the acquiring unit comes close to a constant value, wherein the first signal light is an X-polarized wave and the second signal light is a Y-polarized wave, and the control unit changes the intensity of the X-polarized wave by an intensity manipulation amount X represented by the following equation:

$$X = \frac{(TXout\_Psig\_y\_pola) \times (RXin\_Psig\_y\_pola) - (TXout\_Psig\_x\_pola) \times (Rin\_Psig\_x\_pola)}{(TXout\_Psig\_x\_pola) + (TXout\_Psig\_y\_pola) + (RXin\_Psig\_x\_pola) + (RXin\_Psig\_y\_pola)}$$

where TXout Psig x pola is the intensity of the X-polarized wave transmitted from the optical transmitting device; TXout Psig y pola is the intensity of the Y-polarized wave transmitted from the optical transmitting device; RXin Psia x pola is the intensity of the X-polarized wave received by the optical receiving device; and RXin Psig y pola is the intensity of the Y-polarized wave received by the optical receiving device.

* * * * *